US012409533B2

(12) United States Patent
Chikaraishi et al.

(10) Patent No.: US 12,409,533 B2
(45) Date of Patent: Sep. 9, 2025

(54) IMPACT TOOL

(71) Applicant: MAKITA CORPORATION, Anjo (JP)

(72) Inventors: Makoto Chikaraishi, Anjo (JP); Koji Yamanaka, Anjo (JP); Koji Tsukamoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 46 days.

(21) Appl. No.: 18/518,723

(22) Filed: Nov. 24, 2023

(65) Prior Publication Data

US 2024/0173826 A1 May 30, 2024

(30) Foreign Application Priority Data

Nov. 30, 2022 (JP) ................................ 2022-192312
Oct. 4, 2023 (JP) ................................ 2023-173015

(51) Int. Cl.

| | |
|---|---|
| ***B25B 21/02*** | (2006.01) |
| ***B25B 23/18*** | (2006.01) |
| ***B25D 17/06*** | (2006.01) |
| ***B25F 5/02*** | (2006.01) |

(52) U.S. Cl.

CPC .............. *B25B 21/02* (2013.01); *B25B 23/18* (2013.01); *B25D 17/06* (2013.01); *B25F 5/02* (2013.01)

(58) Field of Classification Search

CPC ......... B25B 21/02; B25B 23/18; B25D 17/06; B25F 5/02

See application file for complete search history.

(56) References Cited

U.S. PATENT DOCUMENTS

| | | | | |
|---|---|---|---|---|
| 8,317,350 | B2 * | 11/2012 | Friedman | B23Q 17/2404 362/120 |
| 8,328,381 | B2 * | 12/2012 | Dixon | B25F 5/021 362/120 |
| 8,820,955 | B2 | 9/2014 | Dixon et al. | |
| 8,827,483 | B2 | 9/2014 | Dixon et al. | |
| 9,028,088 | B2 * | 5/2015 | Vanko | B25F 5/00 362/120 |
| 9,328,915 | B2 * | 5/2016 | Vanko | B25F 5/021 |
| 2013/0286635 | A1 * | 10/2013 | Dixon | F21V 33/0084 362/119 |
| 2016/0354889 | A1 * | 12/2016 | Ely | B23Q 17/2404 |
| 2018/0126538 | A1 * | 5/2018 | Qiu | G02B 6/0021 |
| 2021/0088210 | A1 * | 3/2021 | Purdy | F21V 33/0084 |
| 2021/0222866 | A1 * | 7/2021 | Niwa | F21V 33/008 |
| 2022/0009064 | A1 * | 1/2022 | Puzio | F21S 9/04 |
| 2022/0203512 | A1 * | 6/2022 | Kondo | H02K 9/06 |
| 2022/0388141 | A1 * | 12/2022 | Xu | F21V 33/0084 |
| 2023/0366533 | A1 * | 11/2023 | Chikaraishi | B25F 5/02 |
| 2024/0051094 | A1 * | 2/2024 | Zhao | B25B 21/02 |
| 2024/0058937 | A1 * | 2/2024 | Chikaraishi | B25F 5/02 |
| 2024/0075609 | A1 * | 3/2024 | Zhao | B25F 5/02 |

FOREIGN PATENT DOCUMENTS

JP 4923883 B2 4/2012

* cited by examiner

*Primary Examiner* — Lucas E. A. Palmer
(74) *Attorney, Agent, or Firm* — Oliff PLC

(57) ABSTRACT

Decreased visibility of a workpiece for an operator is reduced. An impact tool includes a motor, a striker rotatable by the motor, an anvil strikable by the striker in a rotation direction, a hammer case accommodating the striker and having a groove, and a light received in the groove. The light illuminates an area adjacent to a front end of the anvil.

19 Claims, 22 Drawing Sheets

IMPACT TOOL

CROSS-REFERENCE TO RELATED APPLICATIONS

This application claims the benefit of priority to Japanese Patent Application No. 2022-192312, filed on Nov. 30, 2022, and Japanese Patent Application No. 2023-173015, filed on Oct. 4, 2023, the entire contents of which are hereby incorporated by reference.

BACKGROUND

1. Technical Field

The present disclosure relates to an impact tool.

2. Description of the Background

In the technical field of impact tools, lighting systems for power tools are known as described in U.S. Patent Application Publication No. 2016/0354889. The lighting systems for power tools include one or more chip-on-board light-emitting diodes (COB LEDs) as light units.

BRIEF SUMMARY

COB lights emit light with high intensity. When light emitted from a COB light at least partially reaches the eyes of an operator, such light may cause glare to the operator and decrease the visibility of a workpiece. A COB light may receive a shock when, for example, an impact tool including the COB light is dropped, and may have deteriorating light emission performance.

One or more aspects of the present disclosure are directed to a technique for reducing decreased visibility of a workpiece for an operator, and a technique for protecting a light and reducing deterioration in the emission performance of the light.

A first aspect of the present disclosure provides an impact tool, including:

a motor;

a striker rotatable by the motor;

an anvil strikable by the striker in a rotation direction;

a hammer case accommodating the striker, the hammer case having a groove; and a light received in the groove, the light being configured to illuminate an area adjacent to a front end of the anvil.

A second aspect of the present disclosure provides an impact tool, including:

a motor;

a striker rotatable by the motor;

an anvil strikable by the striker in a rotation direction;

a light configured to illuminate an area adjacent to a front end of the anvil; and a hammer case accommodating the striker and holding the light, the hammer case including a projection located radially outward from the light.

A third aspect of the present disclosure provides an impact tool, including:

a motor;

a striker located frontward from the motor, the striker being drivable by the motor;

an anvil strikable by the striker in a rotation direction;

a hammer case accommodating the striker;

a light unit being annular, the light unit being located at a front of the hammer case; and a bumper being annular and comprising an elastomer, the bumper being located outward in a radial direction from the light unit.

The impact tool according to any one of the above aspects of the present disclosure reduces decreased visibility of a workpiece for an operator. The impact tool according to any one of the above aspects of the present disclosure protects the light and reduces deterioration in the emission performance of the light.

DETAILED DESCRIPTION

Figure 1:
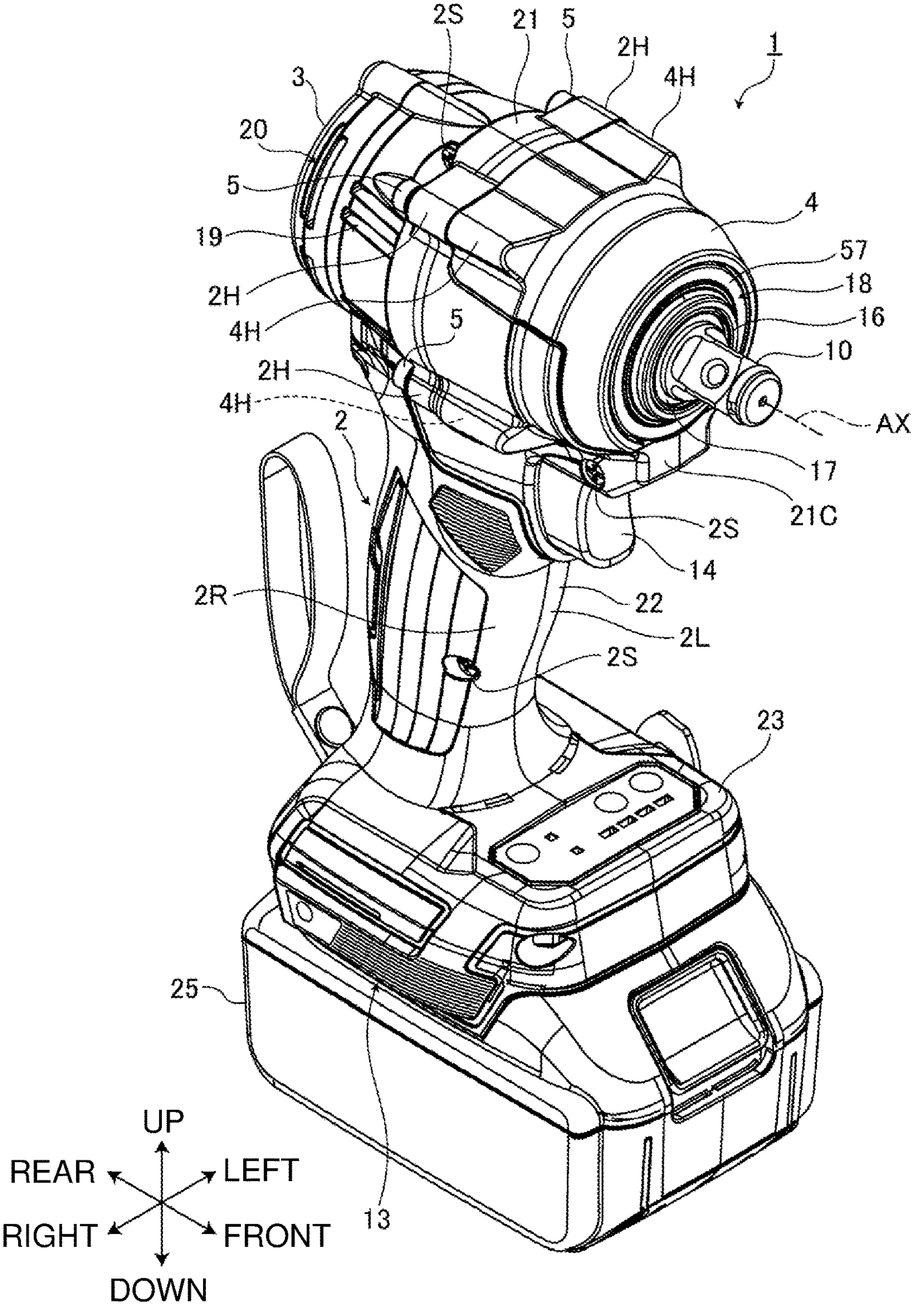
FIG. 1 is a perspective view of an impact tool according to an embodiment as viewed from the front.

A first aspect of the present disclosure provides an impact tool (1), comprising:

a motor (6);

a hammer (47) rotatable by the motor (6);

an anvil (10) strikable by the hammer (47) in a rotation direction;

a hammer case (4) accommodating the hammer (47), the hammer case (4) having a groove (4E); and a light (50) received in the groove (4E), the light (50) being configured to illuminate an area adjacent to a front end of the anvil (10).

A second aspect of the present disclosure provides the impact tool (1) according to the first aspect in which the groove (4E) is recessed rearward from a front end of the hammer case (4).

A third aspect of the present disclosure provides the impact tool (1) according to the first aspect or the second aspect in which the groove (4E) surrounds the anvil (10).

A fourth aspect of the present disclosure provides the impact tool (1) according to any one of the first to third aspects, further comprising:

an optical member (57) including a light transmitter (57C) located frontward from the light (50), wherein the optical member (57) is at least partially received in the groove (4E).

A fifth aspect of the present disclosure provides the impact tool (1) according to the fourth aspect in which the light transmitter (57C) is received in the groove (4E).

A sixth aspect of the present disclosure provides the impact tool (1) according to the fifth aspect in which the optical member (57) includes an outer cylinder (57A) located radially outward from the light (50), and an inner cylinder (57B) located radially inward from the light (50), and the outer cylinder (57A) and the inner cylinder (57B) are located in the groove (4E).

A seventh aspect of the present disclosure provides an impact tool (1), comprising:

a motor (6);

a hammer (47) rotatable by the motor (6);

an anvil (10) strikable by the hammer (47) in a rotation direction;

a light (50) configured to illuminate an area adjacent to a front end of the anvil (10); and a hammer case (4) accommodating the hammer (47) and holding the light (50), the hammer case (4) including a projection (4D) located radially outward from the light (50).

An eighth aspect of the present disclosure provides the impact tool (1) according to the seventh aspect in which the projection (4D) protrudes frontward from the light (50).

A ninth aspect of the present disclosure provides the impact tool (1) according to the seventh aspect or the eighth aspect in which the projection (4D) surrounds the anvil (10).

A tenth aspect of the present disclosure provides the impact tool (1) according to the third aspect or the ninth aspect in which the light (50) includes a substrate (51), and a light-emitting diode chip (52) on a front surface of the substrate (51), and the substrate (51) surrounds the anvil (10).

An eleventh aspect of the present disclosure provides the impact tool (1) according to the ninth aspect, further comprising:

an optical member (57) including a light transmitter (57C) located frontward from the light (50), wherein the projection (4D) is located radially outward from the optical member (57).

A twelfth aspect of the present disclosure provides the impact tool (1) according to the eleventh aspect in which the light transmitter (57C) has an emission surface (57F) aligned with or located rearward from a front end face of the projection (4D).

A thirteenth aspect of the present disclosure provides the impact tool (1) according to the fourth aspect or the eleventh aspect in which the anvil (10) includes an anvil shaft (10C) located radially inward from the optical member (57), the hammer case (4) includes a front cylinder (4B) surrounding the anvil shaft (10C), the impact tool (1) further comprises a snap ring (16) received in a snap ring groove (4F) on the front cylinder (4B), and the snap ring (16) supports the optical member (57) from front.

A fourteenth aspect of the present disclosure provides the impact tool (1) according to the thirteenth aspect in which the optical member (57) includes an inner circumferential protrusion (57G) located radially inward from the light transmitter (57C) and frontward from an emission surface (57F) of the light transmitter (57C), and the snap ring (16) supports the inner circumferential protrusion (57G).

A fifteenth aspect of the present disclosure provides the impact tool (1) according to the fourteenth aspect in which the optical member (57) includes a stopper (57H) supporting an end of the snap ring (16).

A sixteenth aspect of the present disclosure provides the impact tool (1) according to the fourteenth aspect, further comprising:

a shock absorber (80) between a rear surface of the light (50) and the hammer case (4).

A seventeenth aspect of the present disclosure provides the impact tool (1) according to the fourth aspect or the eleventh aspect in which the optical member (57) includes a protrusion (57D) located downward from the light transmitter (57C), the impact tool (1) further comprises a housing (2) fastened to a rear of the hammer case (4) and accommodating the motor (6), and the housing (2) includes a cover (21C) covering the protrusion (57D) from front.

An eighteenth aspect of the present disclosure provides the impact tool (1) according to the seventeenth aspect in which the hammer case (4) has a facing surface (4J) facing an upper surface (21D) of the cover (21C), and the facing surface (4J) extends in a lateral direction.

A nineteenth aspect of the present disclosure provides the impact tool (1) according to the first aspect or the seventh aspect, further comprising:

a housing (2) fastened to a rear of the hammer case (4) with a screw (5), the housing (2) accommodating the motor (6), wherein the hammer case (4) includes a screw boss (4H) engaged with the screw (5), and at least a part of the housing (2) covers the screw boss (4H).

A twentieth aspect of the present disclosure provides the impact tool (1) according to the fourth aspect or the eleventh aspect in which the anvil (10) includes an anvil shaft (10C) located radially inward from the optical member (57), the impact tool (1) further comprises an anvil bearing (46) held by the hammer case (4) and supporting the anvil shaft (10C) in a rotatable manner, and the hammer (47) has a front end located frontward from a rear end of the anvil bearing (46).

A twenty-first aspect of the present disclosure provides the impact tool (1) according to any one of the first to twentieth aspects in which the light (50) is a chip-on-board light (50).

A twenty-second aspect of the present disclosure provides an impact tool (1B), comprising:

a motor (6);

a striker (9) located frontward from the motor (6), the striker (9) being drivable by the motor (6);

an anvil (10) strikable by the striker (9) in a rotation direction;

a hammer case (104) accommodating the striker (9);

a light unit (18) being annular, the light unit (18) being located at a front of the hammer case (104); and a bumper (90) being annular and comprising an elastomer, the bumper (90) being located outward in a radial direction from the light unit (18).

A twenty-third aspect of the present disclosure provides the impact tool (1B) according to the twenty-second aspect in which the light unit (18) is aligned with at least a part of the bumper (90) in a front-rear direction.

A twenty-fourth aspect of the present disclosure provides the impact tool (1B) according to the twenty-second aspect in which the hammer case (104) has a groove (4E) being annular on a front portion of the hammer case (104), and the light unit (18) is received in the groove (4E).

A twenty-fifth aspect of the present disclosure provides the impact tool (1B) according to the twenty-fourth aspect, further comprising:

an anvil bearing (146) supporting the anvil (10) in a rotatable manner, wherein the hammer case (104) includes a rear cylinder (4A) accommodating the striker (9), a front cylinder (4B) located frontward from the rear cylinder (4A), the front cylinder (4B) holding the anvil bearing (146), an annular portion (4C) connecting a front end of the rear cylinder (4A) and a rear end of the front cylinder (4B), and a projection (4D) protruding frontward from an outer edge of the annular portion (4C), the groove (4E) is between the front cylinder (4B) and the projection (4D), and the bumper (90) covers an outer circumferential surface of the projection (4D).

A twenty-sixth aspect of the present disclosure provides the impact tool (1B) according to the twenty-fifth aspect in which the bumper (90) covers a front end face of the projection (4D).

A twenty-seventh aspect of the present disclosure provides the impact tool (1B) according to the twenty-fifth aspect in which the bumper (90) includes a cylindrical portion (91) covering the outer circumferential surface of the projection (4D), and a protrusion (93) protruding inward in the radial direction from an inner circumferential surface of the cylindrical portion (91), the projection (4D) has a bumper groove (4L) on the outer circumferential surface, and the protrusion (93) is received in the bumper groove (4L).

A twenty-eighth aspect of the present disclosure provides the impact tool (1B) according to the twenty-fifth aspect in which the light unit (18) is aligned with at least a part of the anvil bearing (146) in a front-rear direction.

A twenty-ninth aspect of the present disclosure provides the impact tool (1B) according to the twenty-second aspect in which the bumper (90) has a rubber hardness Hs JIS A of less than or equal to 100.

A thirtieth aspect of the present disclosure provides the impact tool (1B) according to the twenty-second aspect in which the striker (9) includes a hammer (47) rotatable by the motor (6), and the bumper (90) is located frontward from the hammer (47) in a front-rear direction.

One or more embodiments will now be described with reference to the drawings. In the embodiments, the positional relationships between the components will be described using the directional terms such as right and left (or lateral), front and rear (or frontward and rearward), and up and down (or vertical). The terms indicate relative positions or directions with respect to the center of an impact tool.

First Embodiment

Impact Tool

Figure 2:
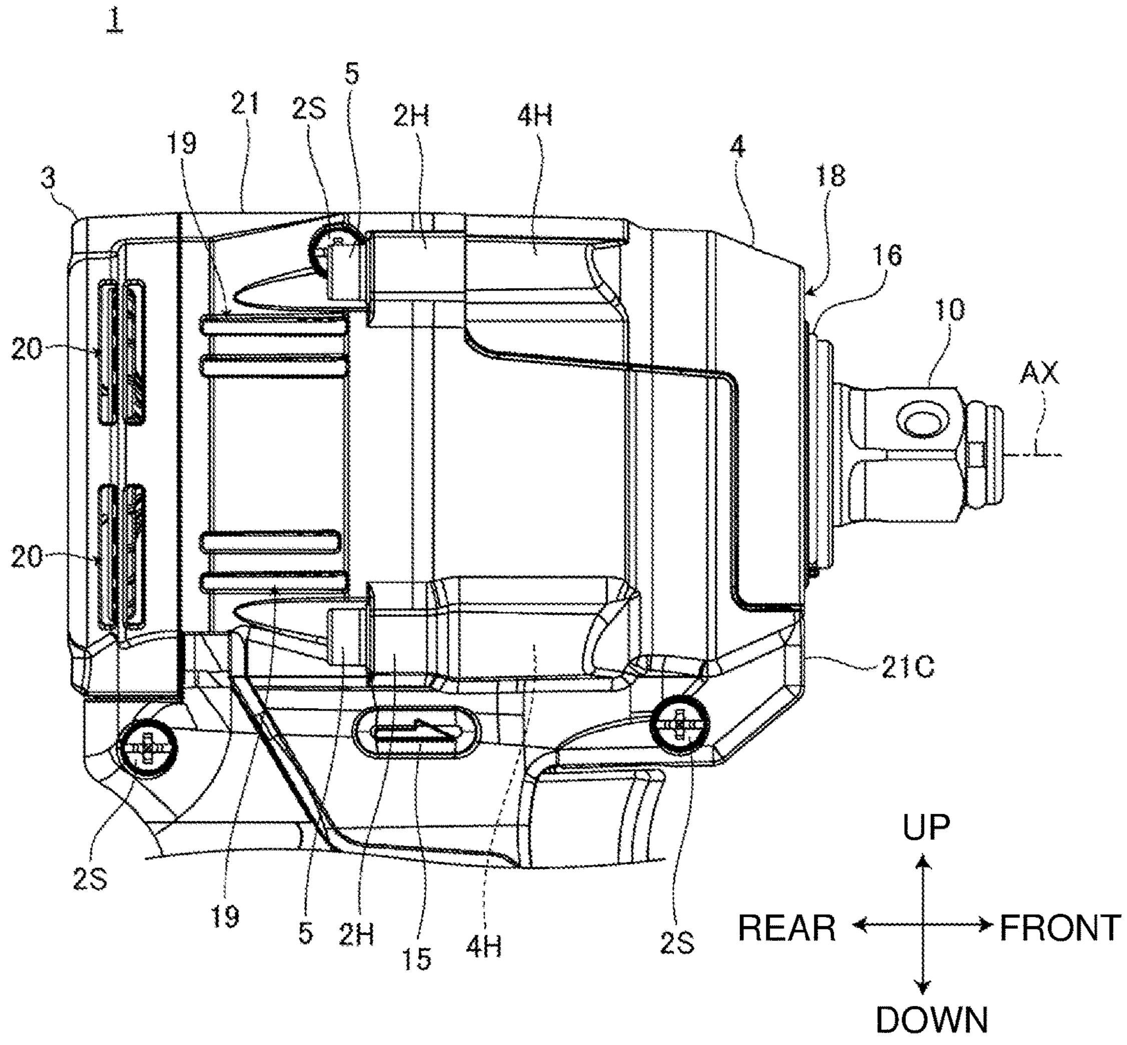
FIG. 2 is a side view of an upper portion of the impact tool according to the embodiment.
Figure 3:
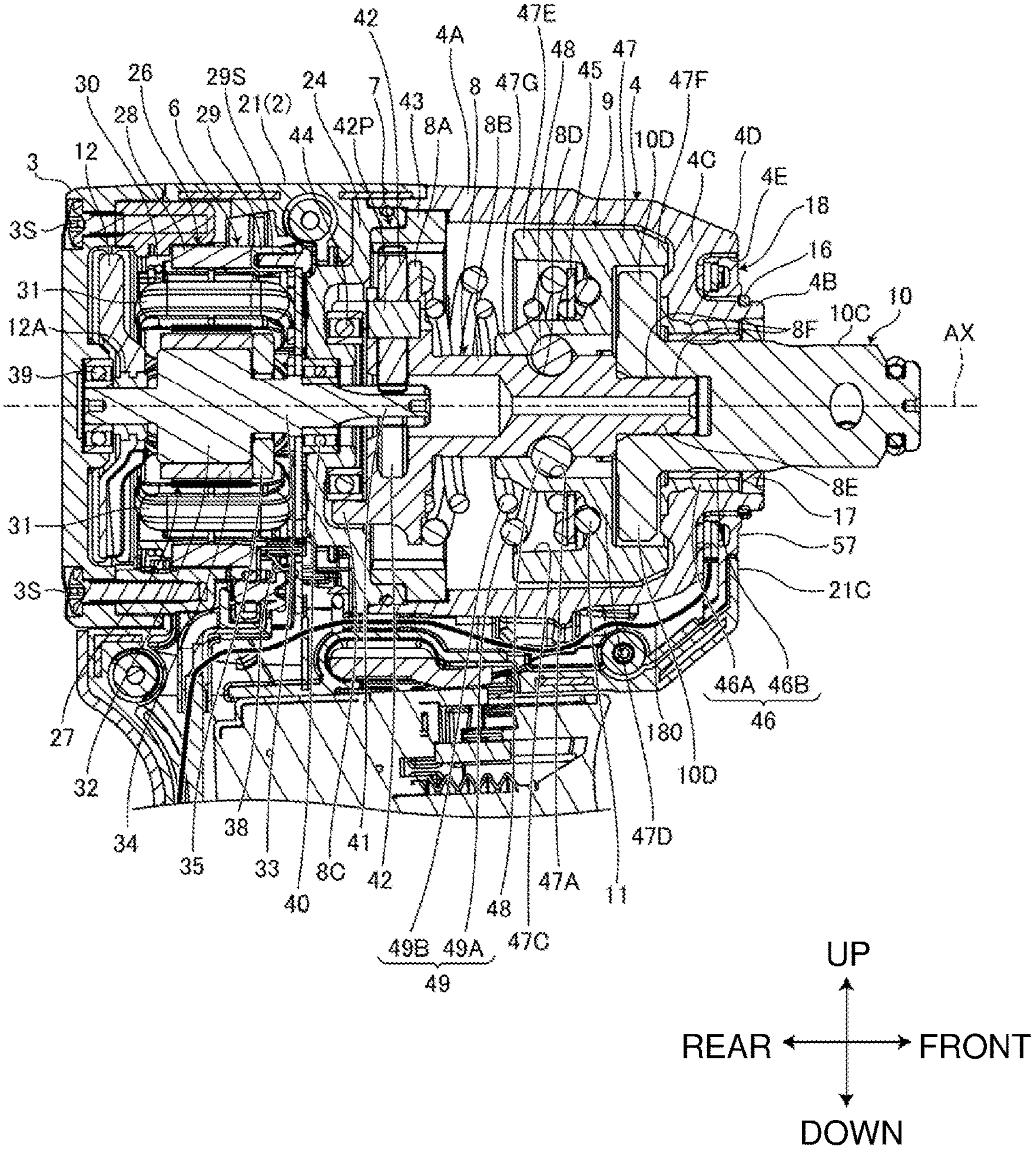
FIG. 3 is a longitudinal sectional view of the upper portion of the impact tool according to the embodiment.
Figure 4:
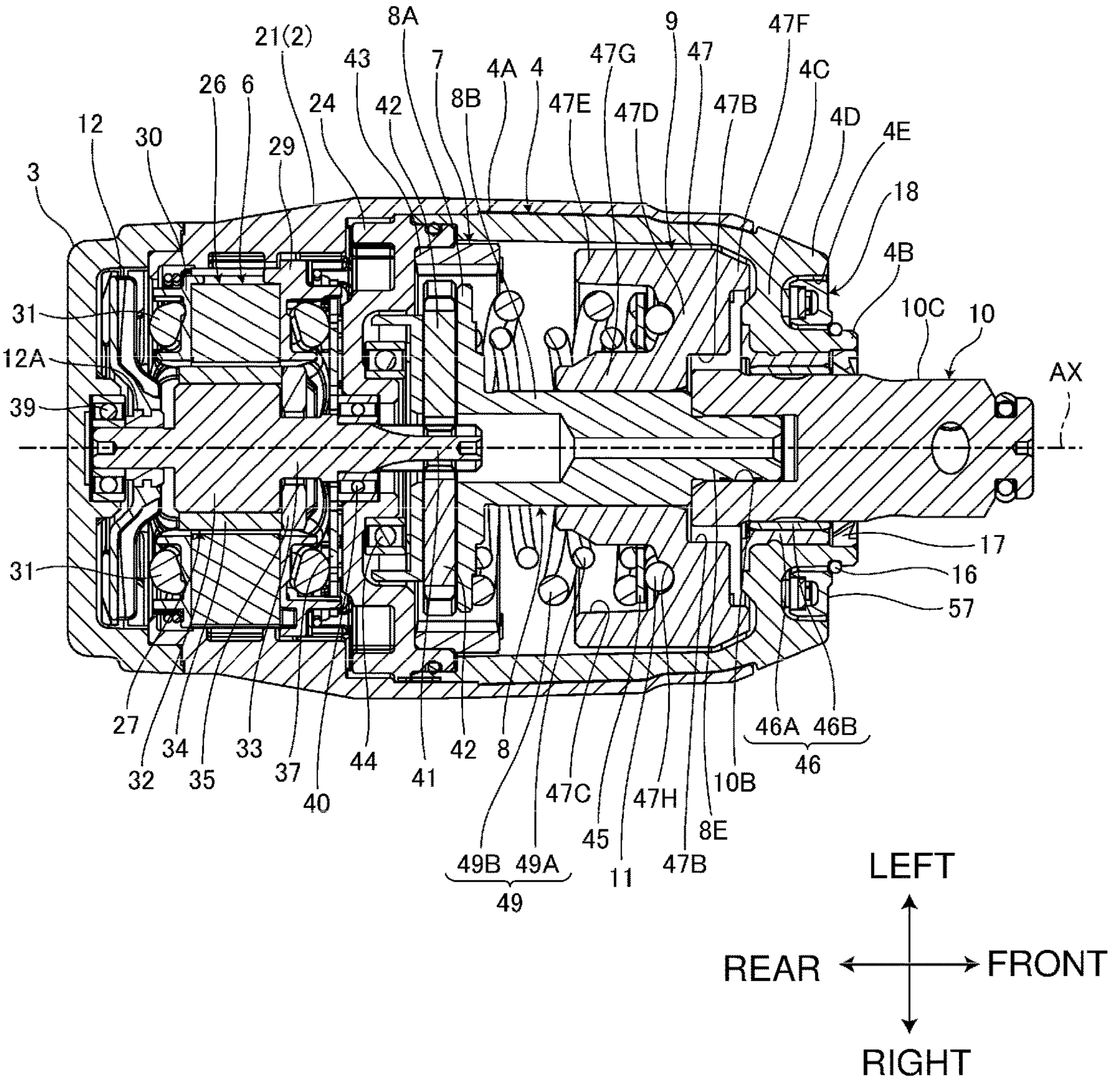
FIG. 4 is a horizontal sectional view of the upper portion of the impact tool according to the embodiment.

FIG. 1 is a perspective view of an impact tool 1 according to the present embodiment as viewed from the front. FIG. 2 is a side view of an upper portion of the impact tool 1. FIG. 3 is a longitudinal sectional view of the upper portion of the impact tool 1. FIG. 4 is a horizontal sectional view of the upper portion of the impact tool 1.

The impact tool 1 according to the embodiment is a power tool including an electric motor 6 as a power source. A direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience. A position nearer the rotation axis AX in the radial direction, or a radial direction toward the rotation axis AX, is referred to as inward in the radial direction or radially inward for convenience. A position farther from the rotation axis AX in the radial direction, or a radial direction away from the rotation axis AX, is referred to as outward in the radial direction or radially outward for convenience. In the embodiments, the rotation axis AX extends in a front-rear direction. A first axial direction is frontward (from the rear to the front), and a second axial direction is rearward (from the front to the rear).

The impact tool 1 according to the embodiment is an impact wrench. The impact tool 1 includes a housing 2, a rear cover 3, a hammer case 4, screws 5, the motor 6, a reducer 7, a spindle 8, a striker 9, an anvil 10, a fan 12, a battery mount 13, a trigger lever 14, a forward-reverse switch lever 15, a snap ring 16, a seal 17, and a light unit 18.

The housing 2 is formed from a synthetic resin. The housing 2 in the embodiment is formed from nylon. The housing 2 includes a left housing 2L and a right housing 2R. The right housing 2R is located on the right of the left housing 2L. The left and the right housings 2L and 2R are fastened together with multiple screws 2S. The housing 2 includes a pair of housing halves.

The housing 2 includes a motor compartment 21, a grip 22, and a battery holder 23.

The motor compartment 21 is cylindrical. The motor compartment 21 accommodates the motor 6, a part of a bearing box 24, and a rear portion of the hammer case 4. The motor compartment 21 includes screw bosses 2H.

The grip 22 protrudes downward from the motor compartment 21. The trigger lever 14 is located in an upper portion of the grip 22. The grip 22 is grippable by an operator.

The battery holder 23 is connected to the lower end of the grip 22. The battery holder 23 has larger outer dimensions than the grip 22 in the front-rear direction and in the lateral direction.

The rear cover 3 is formed from a synthetic resin. The rear cover 3 is located behind the motor compartment 21. The rear cover 3 accommodates at least a part of the fan 12. The fan 12 is located radially inward from the rear cover 3. The rear cover 3 covers an opening in the rear end of the motor compartment 21. The rear cover 3 is fastened to the rear end of the motor compartment 21 with screws 3S.

The motor compartment 21 has inlets 19. The rear cover 3 has outlets 20. Air outside the housing 2 flows into the internal space of the housing 2 through the inlets 19. Air inside the housing 2 flows out of the housing 2 through the outlets 20.

The hammer case 4 serves as a gear case accommodating the reducer 7. The hammer case 4 accommodates the reducer 7. The hammer case 4 accommodates the spindle 8. The hammer case 4 accommodates the striker 9. The hammer case 4 accommodates a part of the anvil 10. The hammer case 4 is formed from a metal. The hammer case 4 in the embodiment is formed from aluminum. The hammer case 4 is cylindrical.

The hammer case 4 includes a rear cylinder 4A, a front cylinder 4B, an annular portion 4C, and screw bosses 4H. The front cylinder 4B is located frontward from the rear cylinder 4A. The rear cylinder 4A has a larger outer diameter than the front cylinder 4B. The rear cylinder 4A has a larger inner diameter than the front cylinder 4B. The annular portion 4C connects the front end of the rear cylinder 4A and the rear end of the front cylinder 4B.

The hammer case 4 is connected to the front of the motor compartment 21. The motor compartment 21 is fastened to the rear of the hammer case 4 with the screws 5. The screws 5 are placed into openings of the screw bosses 2H from the rear, and then into threaded holes of the screw bosses 4H. The screw bosses 2H are four screw bosses 2H arranged circumferentially. The screw bosses 4H are four screw bosses 4H arranged circumferentially. The screws 5 are four screws 5 arranged circumferentially. As shown in FIG. 2, the screws 2S overlap the screws 5 in the front-rear direction and in a vertical direction. The screws 2S are thus unremovable before the screws 5 are removed. The screws 2S are removable after the screws 5 are removed. The left housing 2L and the right housing 2R are fastened with the screws 2S before the hammer case 4 and the motor compartment 21 are fastened with the screws 5.

The bearing box 24 is fastened to the rear of the rear cylinder 4A. The reducer 7 is at least partially located inside the bearing box 24. The hammer case 4 is held between the left housing 2L and the right housing 2R. A part of the bearing box 24 and a rear portion of the rear cylinder 4A are accommodated in the motor compartment 21. The bearing box 24 is fixed to the motor compartment 21 and the hammer case 4.

The motor 6 is a power source for the impact tool 1. The motor 6 generates a rotational force. The motor 6 is an electric motor. The motor 6 is an inner-rotor brushless motor. The motor 6 includes a stator 26 and a rotor 27. The stator 26 is supported on the motor compartment 21. The rotor 27 is at least partially located inside the stator 26. The rotor 27 rotates relative to the stator 26. The rotor 27 rotates about the rotation axis AX extending in the front-rear direction.

The stator 26 includes a stator core 28, a front insulator 29, a rear insulator 30, and multiple coils 31.

The stator core 28 is located outward in the radial direction from the rotor 27. The stator core 28 includes multiple steel plates stacked on one another. The steel plates are metal plates formed from iron as a main component. The stator core 28 is cylindrical. The stator core 28 has multiple teeth to support the coils 31.

The front insulator 29 is located at the front of the stator core 28. The rear insulator 30 is located at the rear of the stator core 28. The front insulator 29 and the rear insulator 30 are electrical insulating members formed from a synthetic resin. The front insulator 29 covers parts of the surfaces of the teeth. The rear insulator 30 covers parts of the surfaces of the teeth.

The coils 31 are attached to the stator core 28 with the front insulator 29 and the rear insulator 30 in between. The coils 31 surround the teeth on the stator core 28 with the front insulator 29 and the rear insulator 30 in between. The coils 31 and the stator core 28 are electrically insulated from each other by the front insulator 29 and the rear insulator 30. The coils 31 are connected to one another with fusing terminals 38.

The rotor 27 rotates about the rotation axis AX. The rotor 27 includes a rotor core 32, a rotor shaft 33, a rotor magnet 34, and a sensor magnet 35.

The rotor core 32 and the rotor shaft 33 are formed from steel. In the embodiment, the rotor core 32 and the rotor shaft 33 are integral with each other. The rotor shaft 33 includes a front portion protruding frontward from the front end face of the rotor core 32. The rotor shaft 33 includes a rear portion protruding rearward from the rear end face of the rotor core 32.

The rotor magnet 34 is fixed to the rotor core 32. The rotor magnet 34 is cylindrical. The rotor magnet 34 surrounds the rotor core 32.

The sensor magnet 35 is fixed to the rotor core 32. The sensor magnet 35 is annular. The sensor magnet 35 is located on the front end face of the rotor core 32 and the front end face of the rotor magnet 34.

A sensor board 37 is attached to the front insulator 29. The sensor board 37 is fastened to the front insulator 29 with a screw 29S. The sensor board 37 includes an annular circuit board and a magnetic sensor supported on the circuit board. The sensor board 37 at least partially faces the sensor magnet 35. The magnetic sensor detects the position of the sensor magnet 35 to detect the position of the rotor 27 in the rotation direction.

The rotor shaft 33 includes the rear portion rotatably supported by a rotor bearing 39. The rotor bearing 39 includes a front portion rotatably supported by a rotor bearing 40. The rotor bearing 39 is held by the rear cover 3. The rotor bearing 40 is held by the bearing box 24. The front end of the rotor shaft 33 is located in the internal space of the hammer case 4 through an opening in the bearing box 24.

A pinion gear 41 is located on the front end of the rotor shaft 33. The pinion gear 41 is connected to at least a part of the reducer 7. The rotor shaft 33 is connected to the reducer 7 with the pinion gear 41 in between.

The reducer 7 transmits a rotational force from the motor 6 to the spindle 8 and the anvil 10. The reducer 7 is accommodated in the rear cylinder 4A in the hammer case 4. The reducer 7 includes multiple gears. The reducer 7 is located frontward from the motor 6. The reducer 7 connects the rotor shaft 33 and the spindle 8. The rotor 27 drives the gears in the reducer 7. The reducer 7 transmits rotation of the rotor 27 to the spindle 8. The reducer 7 rotates the spindle 8 at a lower rotational speed than the rotor shaft 33. The reducer 7 includes a planetary gear assembly.

The reducer 7 includes multiple planetary gears 42 and an internal gear 43. The multiple planetary gears 42 surround the pinion gear 41. The internal gear 43 surrounds the multiple planetary gears 42. The pinion gear 41, the planetary gears 42, and the internal gear 43 are accommodated in the hammer case 4 and the bearing box 24. Each planetary gear 42 meshes with the pinion gear 41. The planetary gears 42 are rotatably supported by the spindle 8 with a pin 42P. The spindle 8 is rotated by the planetary gears 42. The internal gear 43 has internal teeth that mesh with the planetary gears 42. The internal gear 43 is fixed to the bearing box 24. The internal gear 43 is constantly nonrotatable relative to the bearing box 24.

When the rotor shaft 33 rotates as driven by the motor 6, the pinion gear 41 rotates, and the planetary gears 42 revolve about the pinion gear 41. The planetary gears 42 revolve while meshing with the internal teeth on the internal gear 43. The spindle 8, which is connected to the planetary gears 42 with the pin 42P, thus rotates at a lower rotational speed than the rotor shaft 33.

The spindle 8 rotates with a rotational force from the motor 6. The spindle 8 is located frontward from at least a part of the motor 6. The spindle 8 is located frontward from the stator 26. The spindle 8 is at least partially located frontward from the rotor 27. The spindle 8 is at least partially located in front of the reducer 7. The spindle 8 is rotated by the rotor 27. The spindle 8 rotates with a rotational force from the rotor 27 transmitted through the reducer 7.

The spindle 8 includes a flange 8A and a spindle shaft 8B. The spindle shaft 8B protrudes frontward from the flange 8A. The planetary gears 42 are rotatably supported by the flange 8A with the pin 42P. The rotation axis of the spindle 8 aligns with the rotation axis AX of the motor 6. The spindle 8 rotates about the rotation axis AX.

The spindle 8 is rotatably supported by a spindle bearing 44. The spindle bearing 44 is held by the bearing box 24. The spindle 8 includes a ring portion 8C protruding rearward from the rear of the flange 8A. The spindle bearing 44 is located inward from the ring portion 8C. The spindle bearing 44 in the embodiment includes an outer ring connected to the ring portion 8C. The spindle bearing 44 includes an inner ring supported by the bearing box 24.

The striker 9 is driven by the motor 6. A rotational force from the motor 6 is transmitted to the striker 9 through the reducer 7 and the spindle 8. The striker 9 strikes the anvil 10 in the rotation direction with a rotational force of the spindle 8 rotated by the motor 6. The striker 9 includes a hammer 47, balls 48, and coil springs 49. The striker 9 including the hammer 47 is accommodated in the hammer case 4.

The hammer 47 is located frontward from the reducer 7. The hammer 47 is accommodated in the rear cylinder 4A. The hammer 47 surrounds the spindle shaft 8B. The hammer 47 is held by the spindle shaft 8B. The balls 48 are between the spindle shaft 8B and the hammer 47. The coil springs 49 are supported by the flange 8A and the hammer 47.

The hammer 47 includes an annular body 47D, a rear outer cylinder 47E, a front outer cylinder 47F, an inner cylinder 47G, a hammer groove 47A, and two hammer projections 47B. The rear outer cylinder 47E protrudes rearward from an outer circumference of the body 47D. The front outer cylinder 47F protrudes frontward from the outer circumference of the body 47D. The inner cylinder 47G protrudes rearward from an inner circumference of the body 47D.

The body 47D surrounds the spindle shaft 8B. The body 47D is annular. The rear outer cylinder 47E and the inner cylinder 47G both protrude rearward from the body 47D. A recess 47C is defined by the rear surface of the body 47D, the inner circumferential surface of the rear outer cylinder 47E, and the outer circumferential surface of the inner cylinder 47G. The recess 47C is recessed frontward from the rear end of the hammer 47. The recess 47C is ring-shaped. The hammer projections 47B protrude frontward from the body 47D. The hammer projections 47B protrude inward in the radial direction from the inner circumferential surface of the front outer cylinder 47F. The rear outer cylinder 47E and the front outer cylinder 47F allow the hammer 47 to generate a greater inertial force in the rotation direction.

The hammer 47 is rotated by the motor 6. A rotational force from the motor 6 is transmitted to the hammer 47 through the reducer 7 and the spindle 8. The hammer 47 is rotatable together with the spindle 8 with the rotational force of the spindle 8 rotated by the motor 6. The rotation axis of the hammer 47 and the rotation axis of the spindle 8 align with the rotation axis AX of the motor 6. The hammer 47 rotates about the rotation axis AX.

The balls 48 are formed from a metal such as steel. The balls 48 are between the spindle shaft 8B and the hammer 47. The spindle 8 has a spindle groove 8D. The spindle groove 8D receives at least parts of the balls 48. The spindle groove 8D is on the outer circumferential surface of the spindle shaft 8B. The hammer 47 has the hammer groove 47A. The hammer groove 47A receives at least parts of the balls 48. The hammer groove 47A is on the inner surface of the inner cylinder 47G. The balls 48 are between the spindle groove 8D and the hammer groove 47A. The balls 48 roll along the spindle groove 8D and the hammer groove 47A. The hammer 47 is movable together with the balls 48. The spindle 8 and the hammer 47 are movable relative to each other in the axial direction and in the rotation direction within a movable range defined by the spindle groove 8D and the hammer groove 47A.

The coil springs 49 generate an elastic force for moving the hammer 47 forward. The coil springs 49 in the embodiment include a first coil spring 49A and a second coil spring 49B. The first coil spring 49A and the second coil spring 49B are located parallel to each other. The coil springs 49 are between the flange 8A and the hammer 47. The ring-shaped recess 47C is on the rear surface of the hammer 47. The recess 47C is recessed frontward from the rear surface of the hammer 47. A washer 45 is received in the recess 47C. The washer 45 is supported by the body 47D with balls 11 in between. The balls 11 are received in a ball groove 47H on the rear surface of the body 47D. The rear ends of the coil springs 49 are supported by the flange 8A. The front ends of the coil springs 49 are received in the recess 47C and supported by the washer 45.

The anvil 10 is an output unit in the impact tool 1 and is operable with a rotational force from the motor 6. The anvil 10 rotates with the rotational force from the motor 6. The anvil 10 is at least partially located frontward from the hammer 47.

The anvil 10 includes a rod-like anvil shaft 10C and anvil projections 10D. The anvil shaft 10C has a substantially rectangular outer shape as viewed in a direction perpendicular to the rotation axis AX. The anvil shaft 10C receives a socket that is a tip tool. The anvil 10 has a recess 10B at its rear end. The spindle shaft 8B includes a protrusion 8E on its front end. The recess 10B on the rear end of the anvil 10 receives the protrusion 8E on the front end of the spindle shaft 8B. The anvil projections 10D are located on the rear end of the anvil 10. The anvil projections 10D protrude outward in the radial direction from the rear end of the anvil shaft 10C. The protrusion 8E has two grease grooves 8F.

The anvil 10 is rotatably supported by an anvil bearing 46. The rotation axis of the anvil 10, the rotation axis of the hammer 47, and the rotation axis of the spindle 8 align with the rotation axis AX of the motor 6. The anvil 10 rotates about the rotation axis AX. The anvil bearing 46 is located inward from the front cylinder 4B. The anvil bearing 46 is held by the front cylinder 4B in the hammer case 4. The front cylinder 4B surrounds the anvil shaft 10C. The anvil bearing 46 supports the anvil shaft 10C in a rotatable manner. The anvil bearing 46 in the embodiment includes an outer sleeve 46A and an inner sleeve 46B. The inner sleeve 46B is located radially inward from the outer sleeve 46A.

The hammer projections 47B can come in contact with the anvil projections 10D. When the motor 6 operates with the hammer projections 47B and the anvil projections 10D in contact with each other, the anvil 10 rotates together with the hammer 47 and the spindle 8.

The anvil 10 is strikable by the hammer 47 in the rotation direction. When, for example, the anvil 10 receives a higher load in a screwing operation, the anvil 10 cannot rotate with power generated by the motor 6 alone. This stops the rotation of the anvil 10 and the hammer 47. The spindle 8 and the hammer 47 are movable relative to each other in the axial direction and in the circumferential direction with the balls 48 in between. When the hammer 47 stops rotating, the spindle 8 continues to rotate with power generated by the motor 6. When the hammer 47 stops rotating and the spindle 8 rotates, the balls 48 move backward as being guided along the spindle groove 8D and the hammer groove 47A. The hammer 47 receives a force from the balls 48 to move backward with the balls 48. In other words, the hammer 47 moves backward when the anvil 10 stops rotating and the spindle 8 rotates. As the hammer 47 moves backward, the hammer projections 47B come out of contact with the anvil projections 10D.

The coil springs 49 generate an elastic force for moving the hammer 47 forward. The hammer 47 moved backward moves forward under the elastic force from the coil springs 49. When moving forward, the hammer 47 receives a force in the rotation direction from the balls 48. In other words, the hammer 47 moves forward while rotating. The hammer projections 47B then come in contact with the anvil projections 10D while rotating. Thus, the anvil projections 10D are struck by the hammer projections 47B in the rotation direction. The anvil 10 receives power from the motor 6 and an inertial force from the hammer 47. The anvil 10 thus rotates about the rotation axis AX at high torque.

The fan 12 rotates with a rotational force from the motor 6. The fan 12 is located rearward from the stator 26. The fan 12 generates an airflow for cooling the motor 6. The fan 12 is fastened to at least a part of the rotor 27. The fan 12 is fastened to the rear of the rotor shaft 33 with a bush 12A. The fan 12 is between the rotor bearing 39 and the stator 26. The fan 12 rotates as the rotor 27 rotates. As the rotor shaft 33 rotates, the fan 12 rotates together with the rotor shaft 33. Thus, air outside the housing 2 flows into the internal space of the housing 2 through the inlets 19 to cool the motor 6. As the fan 12 rotates, the air passing through the housing 2 flows out of the housing 2 through the outlets 20.

The battery mount 13 is located in a lower portion of the battery holder 23. A battery pack 25 is attached to the battery mount 13 in a detachable manner. The battery pack 25 serves as a power supply for the impact tool 1. The battery pack 25 includes a secondary battery. The battery pack 25 in the embodiment includes a rechargeable lithium-ion battery. The battery pack 25 is attached to the battery mount 13 to power the impact tool 1. The motor 6 and the light unit 18 are each driven by power supplied from the battery pack 25.

The trigger lever 14 is located on the grip 22. The trigger lever 14 is operable by the operator to activate the motor 6. The trigger lever 14 is operable to switch the motor 6 between the driving state and the stopped state.

The forward-reverse switch lever 15 is located above the grip 22. The forward-reverse switch lever 15 is operable by the operator. The forward-reverse switch lever 15 is operable to switch the rotation direction of the motor 6 between forward and reverse. This operation switches the rotation direction of the spindle 8.

Light Unit

Figure 5:
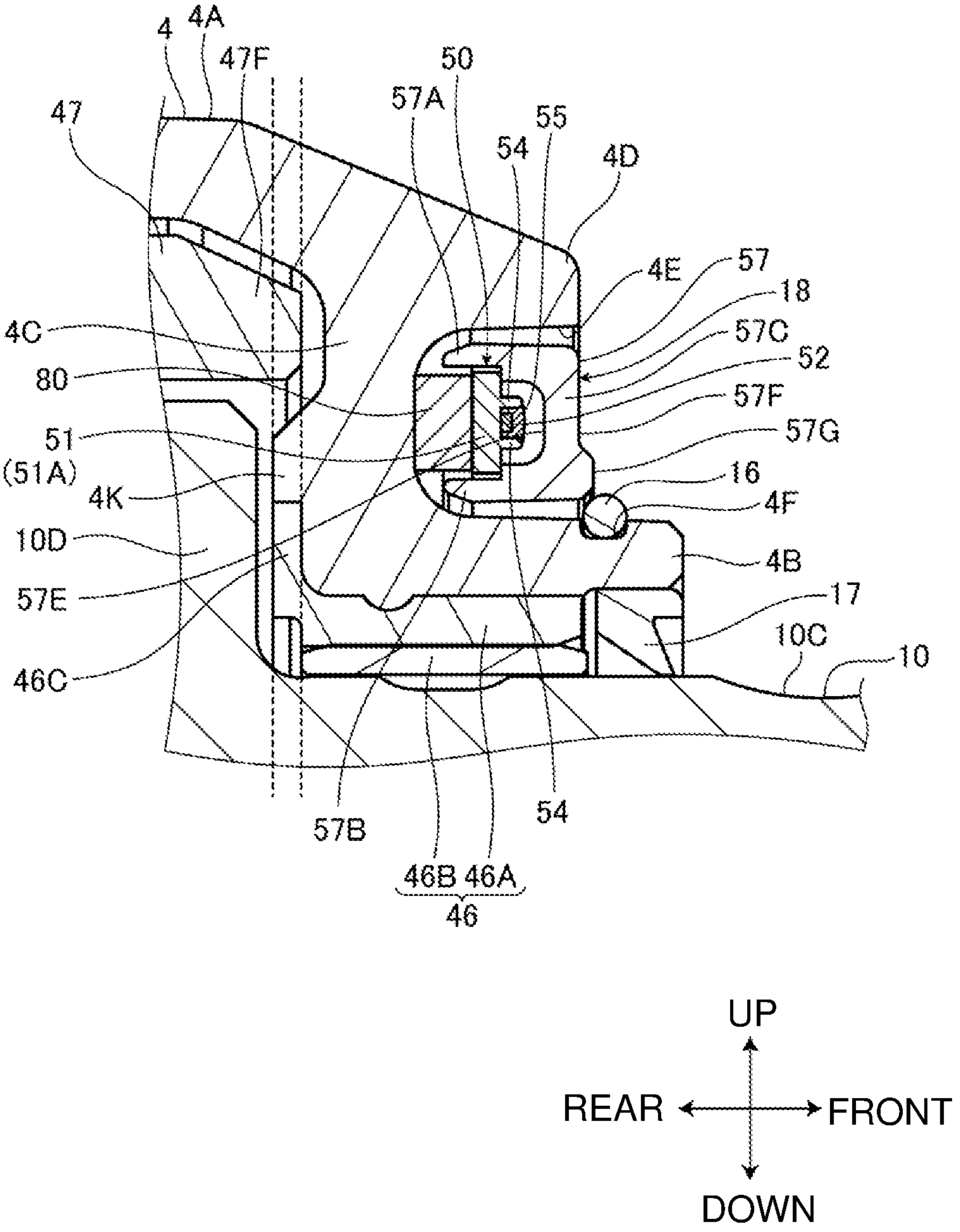
FIG. 5 is a partial sectional view of a light unit in the embodiment.
Figure 6:
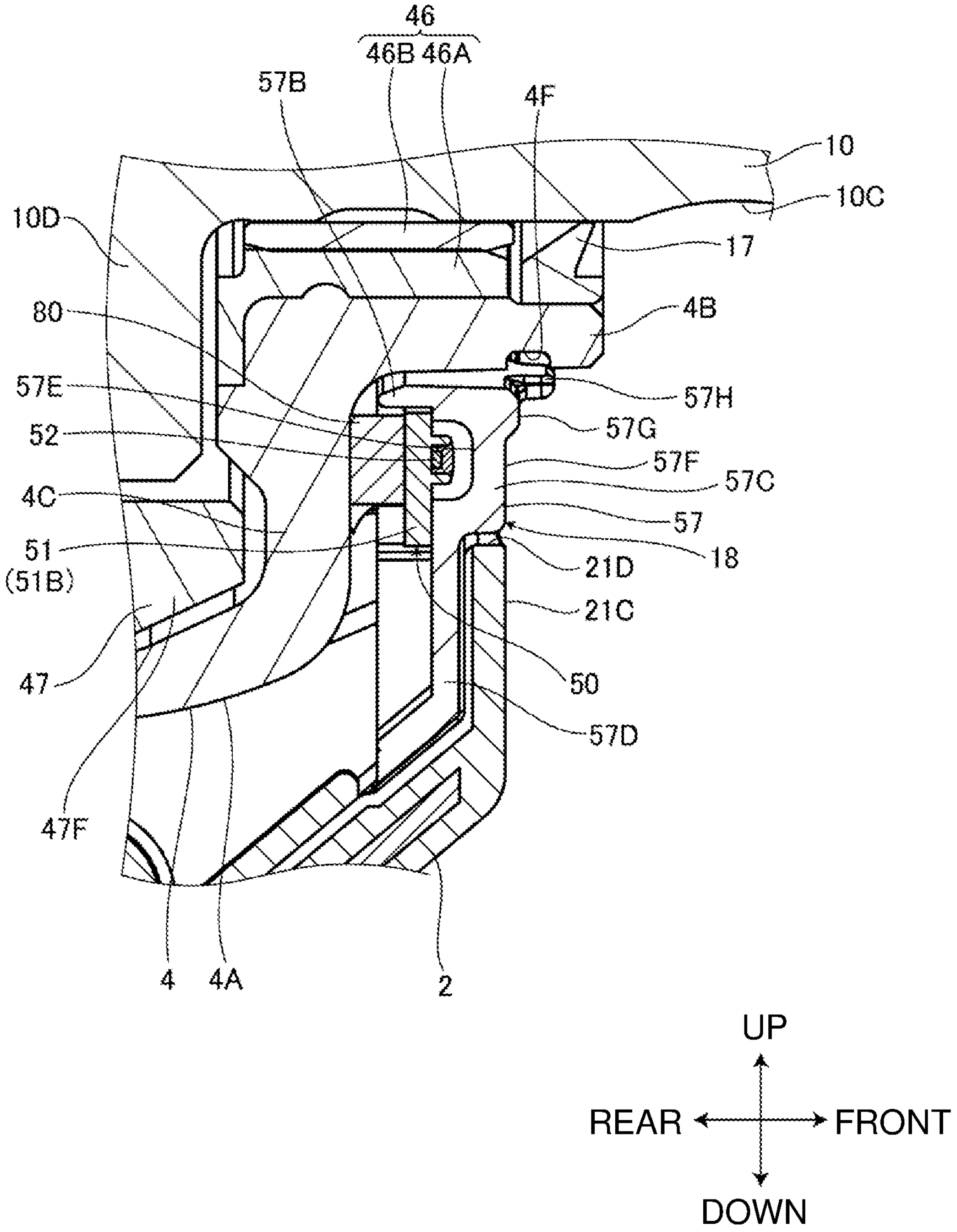
FIG. 6 is a partial sectional view of the light unit in the embodiment.
Figure 7:
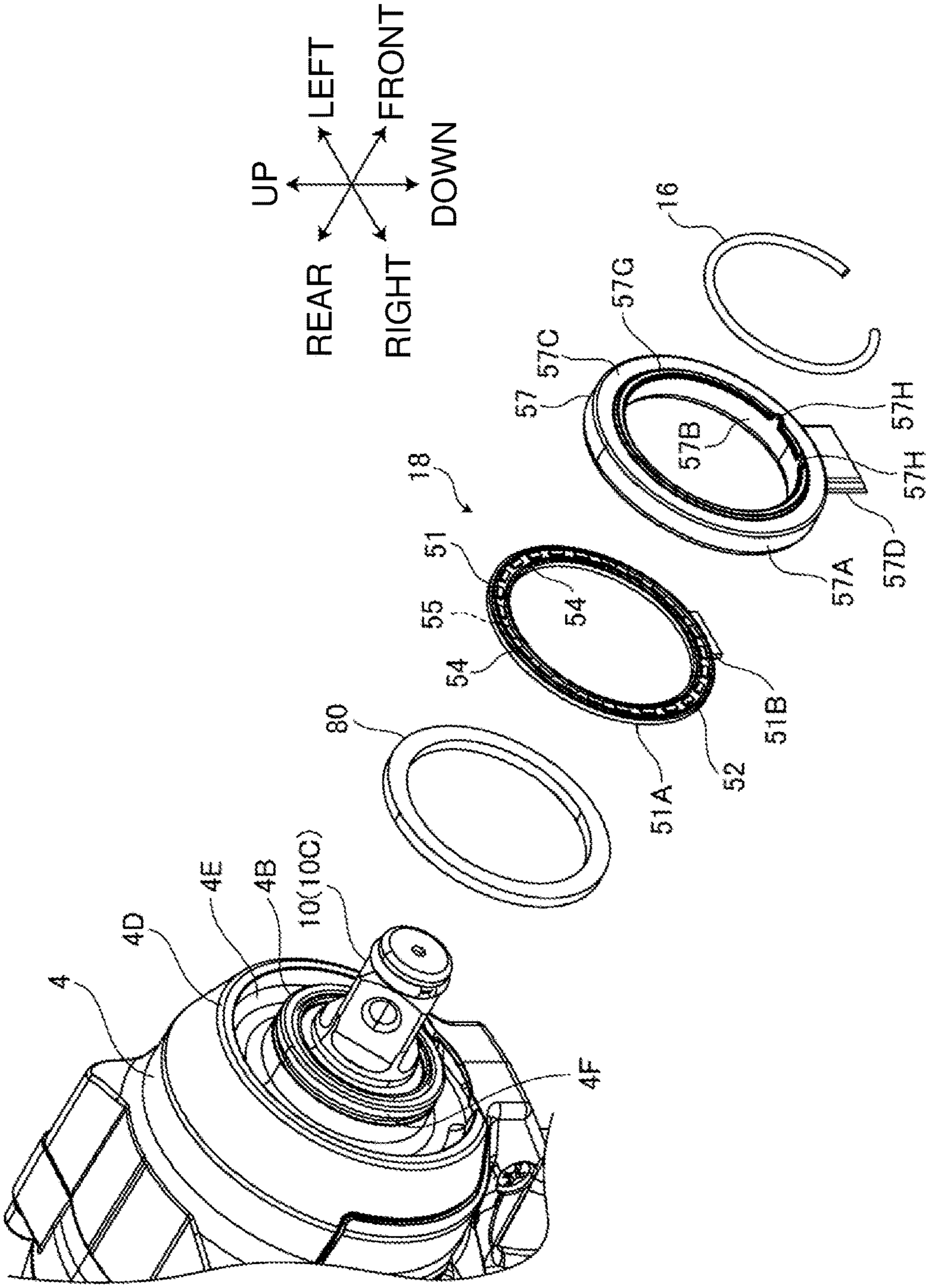
FIG. 7 is an exploded perspective view of the upper portion of the impact tool according to the embodiment as viewed from the front.
Figure 8:
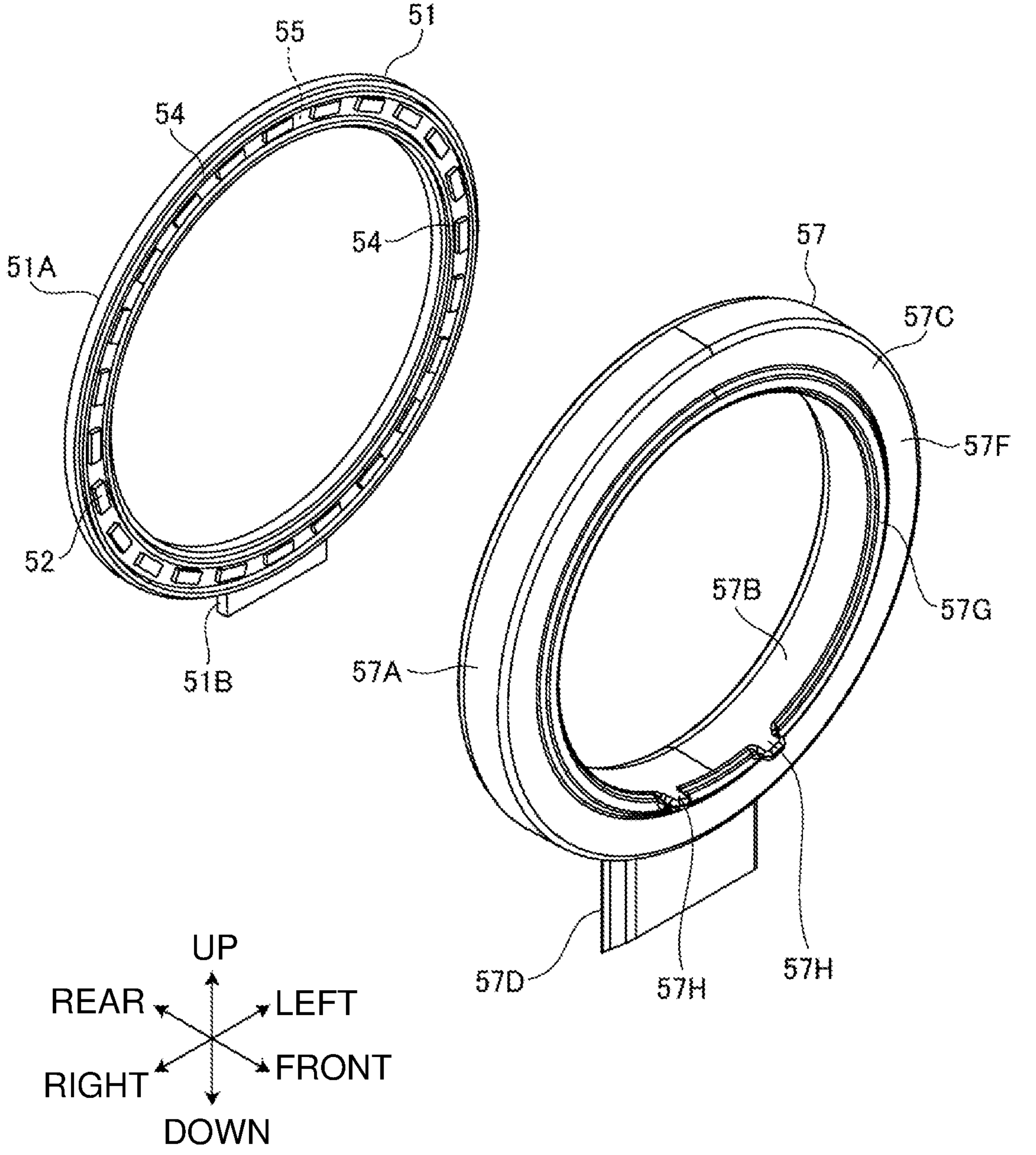
FIG. 8 is a perspective view of the light unit in the embodiment as viewed from the front.
Figure 9:
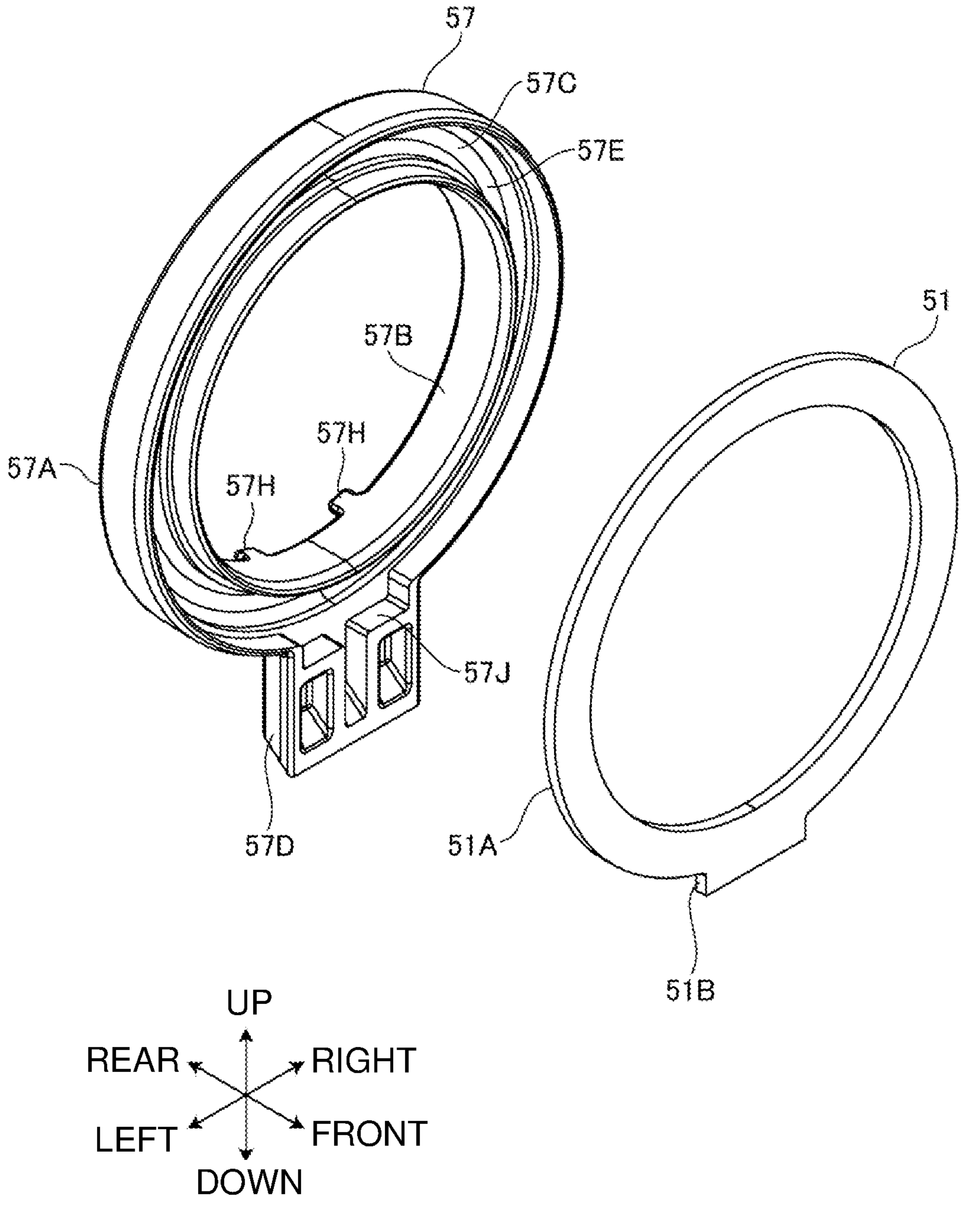
FIG. 9 is a perspective view of the light unit in the embodiment as viewed from the rear.
Figure 10:
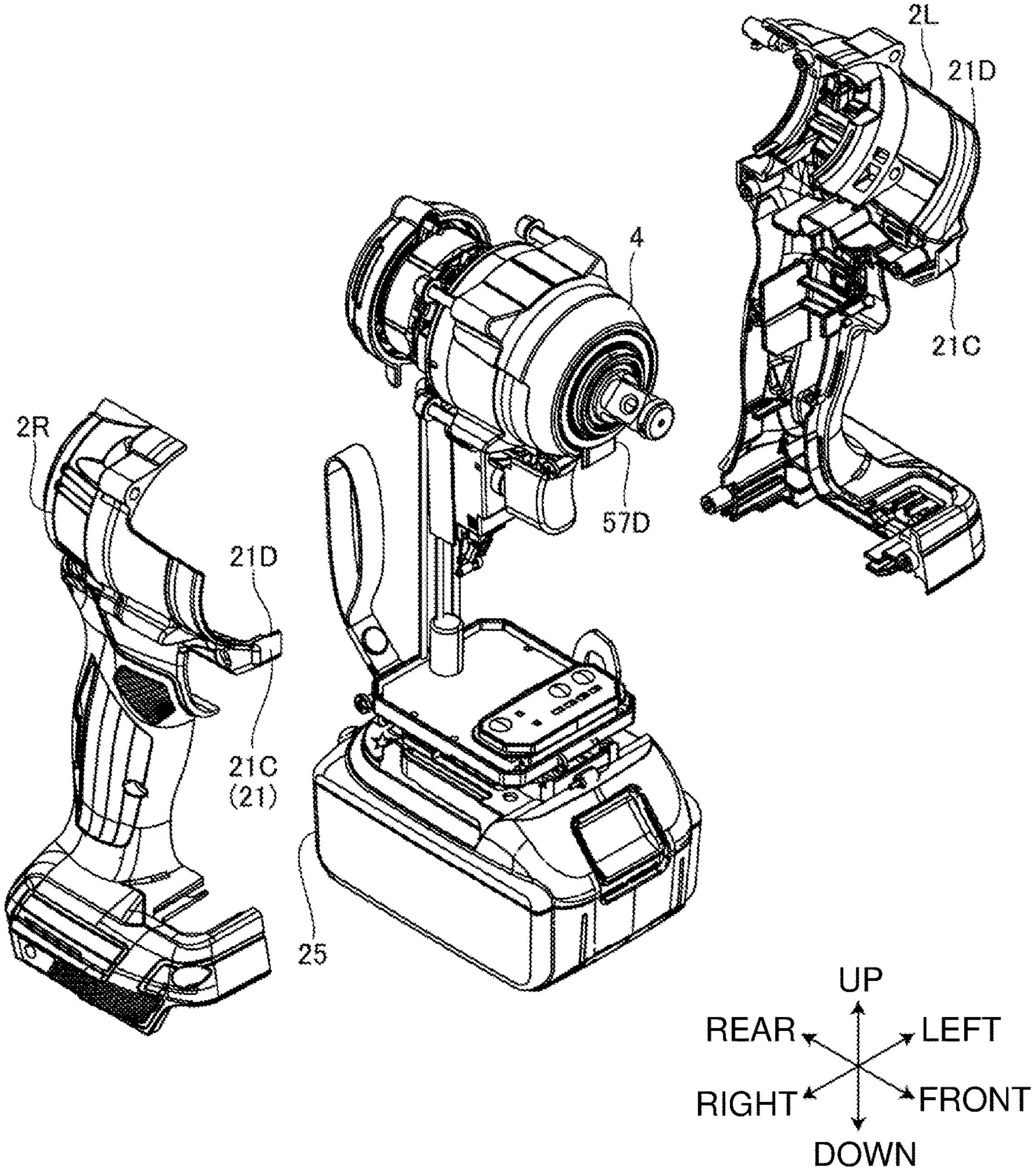
FIG. 10 is an exploded perspective view of the impact tool according to the embodiment as viewed from the front.
Figure 11:
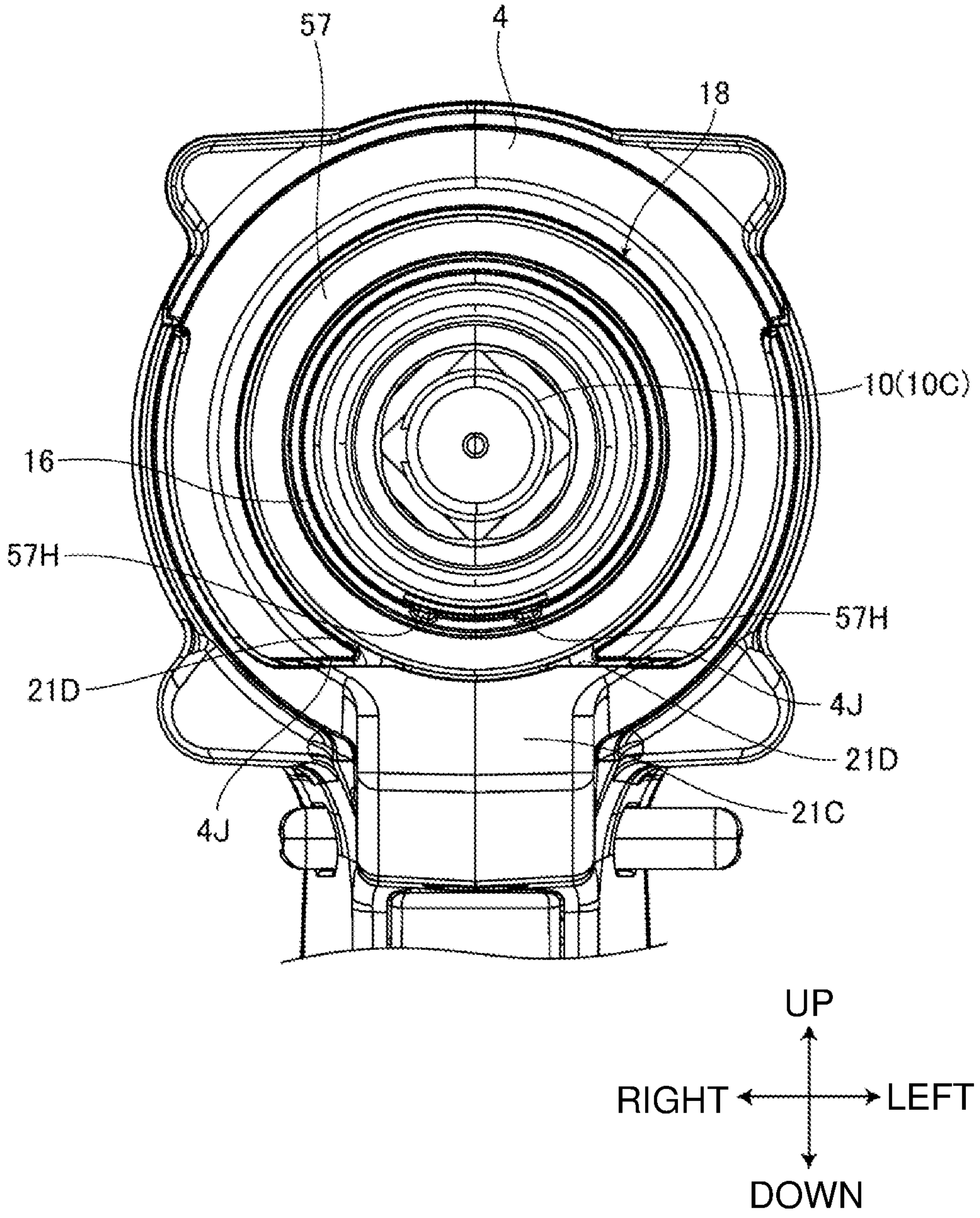
FIG. 11 is a front view of the light unit in the embodiment.

FIGS. 5 and 6 are each a partial sectional view of the light unit 18 in the embodiment. FIG. 5 is a cross-sectional view of an upper portion of the light unit 18. FIG. 6 is a cross-sectional view of a lower portion of the light unit 18. FIG. 7 is an exploded perspective view of the upper portion of the impact tool 1 as viewed from the front. FIG. 8 is a perspective view of the light unit 18 as viewed from the front. FIG. 9 is a perspective view of the light unit 18 as viewed from the rear. FIG. 10 is an exploded perspective view of the impact tool 1 as viewed from the front. FIG. 11 is a front view of the light unit 18.

The light unit 18 emits illumination light. The light unit 18 illuminates the anvil 10 and an area adjacent to the anvil 10 with illumination light. The light unit 18 illuminates the front end of the anvil 10 and an area adjacent to the front end of the anvil 10 with illumination light.

The light unit 18 is located at the front of the hammer case 4. The light unit 18 surrounds the front cylinder 4B. The light unit 18 surrounds the anvil shaft 10C with the front cylinder 4B in between.

The light unit 18 includes a light 50. The light 50 in the embodiment includes a chip-on-board light-emitting diode (COB LED). The light 50 is hereafter referred to as a COB light 50 as appropriate. The COB light 50 illuminates the front end of the anvil 10 and the area adjacent to the front end of the anvil 10.

The COB light 50 includes a substrate 51, LED chips 52 being light emitters, banks 54, and a phosphor 55. The substrate 51 is, for example, an aluminum substrate, a glass fabric base epoxy resin substrate (flame retardant 4 or FR-4 substrate), or a composite base epoxy resin substrate (composite epoxy material 3 or CEM-3 substrate). The LED chips 52 are mounted on the front surface of the substrate 51. The LED chips 52 are connected to the substrate 51 with gold wires (not shown). The gold wires interconnect the multiple LED chips 52. The banks 54 are located on the front surface of the substrate 51. The banks 54 surround the LED chips 52. One bank 54 is located inward in the radial direction from the LED chips 52, and the other bank 54 is located outward in the radial direction from the LED chips 52. The banks 54 define the space for the phosphor 55. The phosphor 55 covers the LED chips 52 between the banks 54. A pair of electrodes (not shown) are located outside the banks 54 on the front surface of the substrate 51. The electrodes may be located on the back surface (rear surface) of the substrate 51.

The pair of electrodes are a positive electrode and a negative electrode. Power output from the battery pack 25 is supplied to the electrodes. The power supplied to the electrodes is supplied to the LED chips 52 through the substrate 51 and the gold wires. The LED chips 52 emit light with power supplied from the battery pack 25. The voltage of the battery pack 25 is decreased to 5 V by a controller (not shown) and applied to the LED chips 52. The controller is accommodated in the battery holder 23. The light unit 18 and the controller are connected with lead wires 180.

The light unit 18 includes the COB light 50 and an optical member 57. The COB LED 50 includes the substrate 51, the multiple LED chips 52, the banks 54, and the phosphor 55.

The substrate 51 is annular. The substrate 51 surrounds the anvil shaft 10C with the front cylinder 4B in between. The substrate 51 includes a ring portion 51A and a support 51B. The support 51B protrudes downward from a lower portion of the ring portion 51A. The substrate 51 surrounds the anvil shaft 10C.

The LED chips 52 are mounted on the front surface of the ring portion 51A of the substrate 51. The LED chips 52 at least partially surround the anvil shaft 10C with the front cylinder 4B in between. The multiple LED chips 52 (24 LED chips 52 in the present embodiment) are arranged at intervals in the circumferential direction of the ring portion 51A.

The banks 54 are located on the front surface of the ring portion 51A of the substrate 51. The banks 54 protrude frontward from the front surface of the ring portion 51A. The banks 54 define the space for the phosphor 55. The banks 54 are annular. The banks 54 in the embodiment have a double annular structure. More specifically, the banks 54 in the embodiment include an annular first bank 54 and an annular second bank 54. The first bank 54 is located on the front surface of the ring portion 51A. The second bank 54 is located outward in the radial direction from the first bank 54 on the front surface of the ring portion 51A. The first bank 54 is located inward in the radial direction from the LED chips 52. The second bank 54 is located outward in the radial direction from the LED chips 52. The LED chips 52 are between the first bank 54 and the second bank 54.

The phosphor 55 is located on the front surface of the ring portion 51A of the substrate 51. The phosphor 55 is annular. The phosphor 55 covers the LED chips 52 between the first bank 54 and the second bank 54.

A pair of lead wires (not shown) are connected to the substrate 51. The lead wires are connected to the electrodes described above. The pair of lead wires are supported on the rear surface of the support 51B. The lead wires may be supported on the front surface of the support 51B.

A current output from the battery pack 25 is supplied to the electrodes through the controller (not shown) and the lead wires 180. The voltage of the battery pack 25 is decreased by the controller (not shown) and applied to the electrodes. The current supplied to the electrodes is supplied to the LED chips 52 through the substrate 51 and the gold wires. The LED chips 52 emit light with the current supplied from the battery pack 25.

The optical member 57 is connected to the COB light 50. The optical member 57 is fixed to the substrate 51. The optical member 57 is formed from a polycarbonate resin. The optical member 57 in the embodiment is formed from a polycarbonate resin containing a white diffusion material. The optical member 57 is milk white. The optical member 57 has a light transmittance of 40 to 70% inclusive. With the milk white optical member 57, the profiles of the LED chips 52 are not easily visible from outside the impact tool 1. The impact tool 1 with this structure has an improved design.

The optical member 57 is at least partially located frontward from the COB light 50. The optical member 57 includes an outer cylinder 57A, an inner cylinder 57B, a light transmitter 57C, a protrusion 57D, an inner circumferential protrusion 57G, stoppers 57H, and a recess 57J.

The outer cylinder 57A is located outward in the radial direction from the inner cylinder 57B. The outer cylinder 57A is located radially outward from the COB light 50. The outer cylinder 57A is located outward in the radial direction from the LED chips 52. The COB light 50 is between the outer cylinder 57A and the inner cylinder 57B in the radial direction. The outer cylinder 57A is located outward in the radial direction from the ring portion 51A of the substrate 51. The inner cylinder 57B is located radially inward from the COB light 50. The inner cylinder 57B is located inward in the radial direction from the ring portion 51A of the substrate 51. The inner cylinder 57B is located inward in the radial direction from the LED chips 52.

The light transmitter 57C is located frontward from the COB light 50. The light transmitter 57C is annular. The light transmitter 57C is located frontward from the LED chips 52. The light transmitter 57C connects the front end of the outer cylinder 57A and the front end of the inner cylinder 57B. The light transmitter 57C faces the front surface of the ring portion 51A. The light transmitter 57C faces the LED chips 52. Light emitted from the LED chips 52 passes through the light transmitter 57C and illuminates an area ahead of the light unit 18.

The light transmitter 57C has an incident surface 57E and an emission surface 57F. Light from the LED chips 52 enters the incident surface 57E. The light passing through the light transmitter 57C exits through the emission surface 57F. The front surface of the ring portion 51A faces the incident surface 57E. The incident surface 57E faces the LED chips 52. The incident surface 57E faces substantially rearward. The emission surface 57F faces substantially frontward.

The protrusion 57D is located downward from the light transmitter 57C. The protrusion 57D protrudes downward from a lower portion of the outer cylinder 57A. The protrusion 57D defines an accommodation space in an upper portion of its rear surface. The support 51B in the substrate 51 is received in the accommodation space defined in the upper portion of the rear surface of the protrusion 57D. The protrusion 57D supports the lead wires 180 extending from the substrate 51.

The inner circumferential protrusion 57G is located radially inward from the light transmitter 57C. The inner circumferential protrusion 57G protrudes frontward from the inner circumference of the light transmitter 57C. The inner circumferential protrusion 57G is located frontward from the emission surface 57F of the light transmitter 57C. The inner circumferential protrusion 57G is annular.

The stoppers 57H protrude frontward from a lower portion of the inner circumferential protrusion 57G. The stoppers 57H are two stoppers 57H located in the lower portion of the inner circumferential protrusion 57G. The two stoppers 57H are arranged at a distance from each other in the lateral direction. The support 51B in the substrate 51 is received in the recess 57J on the rear portion of the optical member 57. The support 51B fitted into the recess 57J positions the substrate 51 relative to the optical member 57, restricting relative rotation between the substrate 51 and the optical member 57.

The substrate 51 has its rear surface located frontward from the rear end of the outer cylinder 57A and the rear end of the inner cylinder 57B. The substrate 51 has its rear surface fixed to at least a part of the inner circumferential surface of the outer cylinder 57A with an adhesive. The substrate 51 has its rear surface fixed to at least a part of the outer circumferential surface of the inner cylinder 57B with an adhesive. The COB light 50 is fixed to the optical member 57.

The hammer case 4 includes a projection 4D located radially outward from the COB light 50. The projection 4D protrudes frontward from the COB light 50. The projection 4D is substantially annular. The projection 4D surrounds the anvil shaft 10C. The projection 4D is located radially outward from the optical member 57. The emission surface 57F is aligned with the front end face of the projection 4D in the front-rear direction. In other words, the emission surface 57F is flush with the front end face of the projection 4D. The emission surface 57F may be located rearward from the front end face of the projection 4D in the front-rear direction.

The hammer case 4 has a groove 4E radially inward from the projection 4D. The groove 4E is recessed rearward from the front end of the hammer case 4. The groove 4E is between the front cylinder 4B and the projection 4D in the radial direction. The groove 4E surrounds the anvil shaft 10C.

The COB light 50 is received in the groove 4E. The optical member 57 is at least partially received in the groove 4E. The light transmitter 57C is received in the groove 4E. The outer cylinder 57A and the inner cylinder 57B are received in the groove 4E. The inner circumferential protrusion 57G is located frontward from the front end of the groove 4E.

The snap ring 16 is received in a snap ring groove 4F on the front cylinder 4B. The snap ring groove 4F is located frontward from the front end face of the projection 4D and the emission surface 57F of the light transmitter 57C. The snap ring 16 supports the optical member 57 from the front. The snap ring 16 in the embodiment supports the inner circumferential protrusion 57G from the front.

The stoppers 57H support the ends of the snap ring 16. The snap ring 16 has two ends. The snap ring 16 has its left end supported by a left stopper 57H of the two stoppers 57H and its right end supported by a right stopper 57H of the two stoppers 57H. The snap ring 16 has its left end in contact with the left surface of the left stopper 57H and its right end in contact with the right surface of the right stopper 57H. The stoppers 57H restrict rotation of the snap ring 16 relative to the optical member 57.

A shock absorber 80 is located behind the COB light 50. The shock absorber 80 in the embodiment is a sponge ring. The shock absorber 80 is between the rear surface of the COB light 50 and the hammer case 4. The shock absorber 80 has its rear surface in contact with the front surface of the annular portion 4C in the hammer case 4 and its front surface in contact with the rear surface of the substrate 51 in the COB light 50. The shock absorber 80 is compressed between the rear surface of the COB light 50 and the hammer case 4. As described above, the substrate 51 and the optical member 57 are fixed to each other with an adhesive. The snap ring 16 supports the optical member 57 and the COB light 50 from the front, compressing the shock absorber 80. The optical member 57 and the COB light 50 are held between the shock absorber 80 and the snap ring 16 in the front-rear direction. The optical member 57 and the hammer case 4 in the embodiment are apart from each other. The COB light 50 and the hammer case 4 are apart from each other. The COB light 50 and the optical member 57 are held by the hammer case 4 between the shock absorber 80 and the snap ring 16.

Hammer Case and Housing

The anvil shaft 10C is located radially inward from the optical member 57. The anvil bearing 46 held by the hammer case 4 supports the anvil shaft 10C in a rotatable manner. The anvil bearing 46 is insert-molded in the hammer case 4. In the embodiment, the front outer cylinder 47F in the hammer 47 has its front end located frontward from the rear end of the anvil bearing 46. More specifically, the hammer 47 at least partially overlaps the anvil bearing 46 in the front-rear direction. The seal 17 is retained by the front cylinder 4B.

As shown in FIG. 5, the hammer case 4 includes a protrusion 4K. The protrusion 4K protrudes rearward from the rear surface of the annular portion 4C. The outer sleeve 46A includes a flange 46C. The flange 46C extends outward in the radial direction from the rear end of the outer sleeve 46A. The front outer cylinder 47F has its front end located frontward from the rear end of the protrusion 4K. The front outer cylinder 47F has its front end located frontward from the rear end of the flange 46C. More specifically, the front end of the front outer cylinder 47F overlaps the protrusion 4K and the flange 46C in the front-rear direction. This increases an inertial force from the hammer 47. The flange 46C in contact with the anvil projections 10D reduces the likelihood of the protrusion 4K being shaved by the anvil projections 10D. The snap ring 16 and the seal 17 overlap each other in the front-rear direction. With the seal 17 located rearward, the impact tool 1 is less likely to be elongated in the front-rear direction.

The motor compartment 21 covers lower two screw bosses 4H of the four screw bosses 4H. The housing 2 includes a cover 21C covering the protrusion 57D on the optical member 57 from the front. At least a part of the light emitted from the COB light 50 and passing through the protrusion 57D is blocked by the cover 21C. In other words, the cover 21C reduces leakage of light from the protrusion 57D.

As shown in FIG. 11, the hammer case 4 has a facing surface 4J. The facing surface 4J faces the upper surface 21D of the cover 21C. The facing surface 4J includes a left facing surface 4J and a right facing surface 4J. The left facing surface 4J faces the upper surface 21D of the cover 21C in the left housing 2L. The right facing surface 4J faces the upper surface 21D of the cover 21C in the right housing 2R. The facing surface 4J extends in the lateral direction in a plane perpendicular to the rotation axis AX. The facing surface 4J extends linearly in the plane perpendicular to the rotation axis AX. As shown in FIG. 10, the housing 2 includes the left housing 2L and the right housing 2R. The left housing 2L and the right housing 2R to be joined together can be aligned with each other with the upper surface 21D and the facing surface 4J in contact with each other. The left housing 2L and the right housing 2R can thus be fixed to each other smoothly using the facing surface 4J.

Method of Use

The operator operates the trigger lever 14 to activate the motor 6 and cause the LED chips 52 in the COB light 50 to emit light. The COB light 50 emits light with high intensity and thus can brightly illuminate a workpiece.

When light emitted from the LED chips 52 at least partially passes through the outer cylinder 57A, such light emitted through the outer circumferential surface of the outer cylinder 57A may reach the eyes of the operator and cause glare to the operator. This may decrease the visibility of the workpiece for the operator. In the embodiment, the light emitted through the outer circumferential surface of the outer cylinder 57A is blocked by the projection 4D. This reduces glare to the operator.

The COB light 50 is protected by the projection 4D on the hammer case 4 when, for example, the impact tool 1 is dropped. This reduces breakage of the COB light 50 and deterioration in the emission performance of the COB light 50.

As described above, the impact tool 1 according to the embodiment includes the motor 6, the hammer 47 rotatable by the motor 6, the anvil 10 strikable by the hammer 47 in the rotation direction, the hammer case 4 accommodating the hammer 47, and the COB light 50 that illuminates the front end of the anvil 10 and the area adjacent to the front end of the anvil 10. The hammer case 4 has the groove 4E. The COB light 50 is received in the groove 4E.

In the above structure, with the COB light 50 received in the groove 4E, light emitted frontward from the COB light 50 illuminates a workpiece whereas light emitted radially outward from the COB light 50 is blocked by the hammer case 4. This reduces the likelihood of light emitted from the COB light 50 entering the eyes of the operator and thus reduces glare to the operator. This structure thus reduces decreased visibility of a workpiece for the operator.

The groove 4E in the embodiment is recessed rearward from the front end of the hammer case 4.

This allows light emitted frontward from the COB light 50 to illuminate a workpiece in front of the hammer case 4.

The groove 4E in the embodiment surrounds the anvil 10.

The groove 4E is thus annular.

The impact tool 1 according to the embodiment includes the optical member 57 including the light transmitter 57C located frontward from the COB light 50. The optical member 57 is at least partially received in the groove 4E.

This allows light emitted frontward from the COB light 50 to illuminate a workpiece in front of the hammer case 4 through the light transmitter 57C in the optical member 57. With the optical member 57 received in the groove 4E, light emitted frontward from the optical member 57 illuminates the workpiece whereas light emitted radially outward from the optical member 57 is blocked by the hammer case 4.

The light transmitter 57C in the embodiment is received in the groove 4E.

With the light transmitter 57C received in the groove 4E, light emitted frontward from the optical member 57 illuminates the workpiece whereas light emitted radially outward from the optical member 57 is blocked by the hammer case 4.

The optical member 57 in the embodiment includes the outer cylinder 57A located radially outward from the COB light 50 and the inner cylinder 57B located radially inward from the COB light 50. The outer cylinder 57A and the inner cylinder 57B are received in the groove 4E.

The optical member 57 thus surrounds the COB light 50.

The impact tool 1 according to the embodiment includes the motor 6, the hammer 47 rotatable by the motor 6, the anvil 10 strikable by the hammer 47 in the rotation direction, the COB light 50 that illuminates an area adjacent to the distal end of the anvil 10, and the hammer case 4 accommodating the hammer 47. The hammer case 4 holds the COB light 50. The hammer case 4 includes the projection 4D located radially outward from the COB light 50.

In the above structure, the COB light 50 is protected by the projection 4D on the hammer case 4 when, for example, the impact tool 1 is dropped. This reduces breakage of the COB light 50 and deterioration in the emission performance of the COB light 50.

The projection 4D in the embodiment protrudes frontward from the COB light 50. The COB light 50 is thus protected sufficiently by the projection 4D.

The projection 4D in the embodiment surrounds the anvil 10.

The projection 4D is thus annular.

The COB light 50 in the embodiment includes the substrate 51 and the LED chips 52 mounted on the front surface of the substrate 51. The substrate 51 surrounds the anvil 10.

The impact tool 1 thus includes the annular COB light 50.

The impact tool 1 according to the embodiment includes the optical member 57 including the light transmitter 57C located frontward from the COB light 50. The projection 4D is located radially outward from the optical member 57.

The COB light 50 and the optical member 57 are thus protected by the projection 4D.

The emission surface 57F of the light transmitter 57C in the embodiment is aligned with or located rearward from the front end face of the projection 4D.

The optical member 57 is thus protected sufficiently by the projection 4D.

The anvil 10 in the embodiment includes the anvil shaft 10C located radially inward from the optical member 57. The hammer case 4 includes the front cylinder 4B surrounding the anvil shaft 10C. The impact tool 1 includes the snap ring 16 received in the snap ring groove 4F on the front cylinder 4B. The snap ring 16 supports the optical member 57 from the front.

This reduces the likelihood of the optical member 57 and the COB light 50 slipping frontward from the hammer case 4. The snap ring 16 serves as a retainer that reduces slipping of the optical member 57 and the COB light 50 frontward.

The optical member 57 in the embodiment includes the inner circumferential protrusion 57G located radially inward from the light transmitter 57C and frontward from the emission surface 57F of the light transmitter 57C. The snap ring 16 supports the inner circumferential protrusion 57G.

The snap ring 16 received in the snap ring groove 4F stably supports the optical member 57 from the front.

The optical member 57 in the embodiment may include the stoppers 57H supporting the ends of the snap ring 16.

This restricts rotation of the snap ring 16 relative to the hammer case 4 and the optical member 57. The stoppers 57H serve as rotation locking members that restrict rotation of the snap ring 16.

The impact tool 1 according to the embodiment includes the shock absorber 80 between the rear surface of the COB light 50 and the hammer case 4.

This reduces shock to the COB light 50 when, for example, the impact tool 1 is dropped. The COB light 50 held between the shock absorber 80 and the snap ring 16 in the front-rear direction restricts displacement of the COB light 50 and the hammer case 4 relative to each other.

The optical member 57 in the embodiment includes the protrusion 57D located downward from the light transmitter 57C. The impact tool 1 includes the housing 2 fastened to the rear of the hammer case 4 and accommodating the motor 6. The housing 2 includes the cover 21C covering the protrusion 57D from the front.

This allows the lead wires connected to the COB light 50 to be supported by the protrusion 57D. The cover 21C protects the protrusion 57D. At least a part of light emitted from the COB light 50 and passing through the protrusion 57D is blocked by the cover 21C.

The hammer case 4 in the embodiment has the facing surface 4J facing the upper surface 21D of the cover 21C. The facing surface 4J extends laterally.

When the housing 2 includes a pair of housing halves including the left housing 2L and the right housing 2R, the left housing 2L and the right housing 2R can be smoothly fixed to each other using the facing surface 4J.

The impact tool 1 according to the embodiment includes the housing 2 fastened to the rear of the hammer case 4 with the screws 5 and accommodating the motor 6. The hammer case 4 includes the screw bosses 4H engaged with the screws 5. At least a part of the housing 2 covers the screw bosses 4H.

The housing 2 thus protects the screw bosses 4H in the hammer case 4. The hand of the operator holding the grip 22 in the housing 2 is less likely to touch the hammer case 4 directly.

The anvil 10 in the embodiment includes the anvil shaft 10C located radially inward from the optical member 57. The impact tool 1 includes the anvil bearing 46 held by the hammer case 4 and supporting the anvil shaft 10C in a rotatable manner. The hammer 47 has its front end located frontward from the rear end of the anvil bearing 46.

With the hammer case 4 and the anvil bearing 46 overlapping each other, the impact tool 1 has less size increase. The impact tool 1 has a smaller dimension in the front-rear direction in its upper portion (or has a smaller total length).

Second Embodiment

A second embodiment will be described. The same or corresponding components as those in the above embodiment are given the same reference numerals herein and will be described briefly or will not be described.

Figure 12:
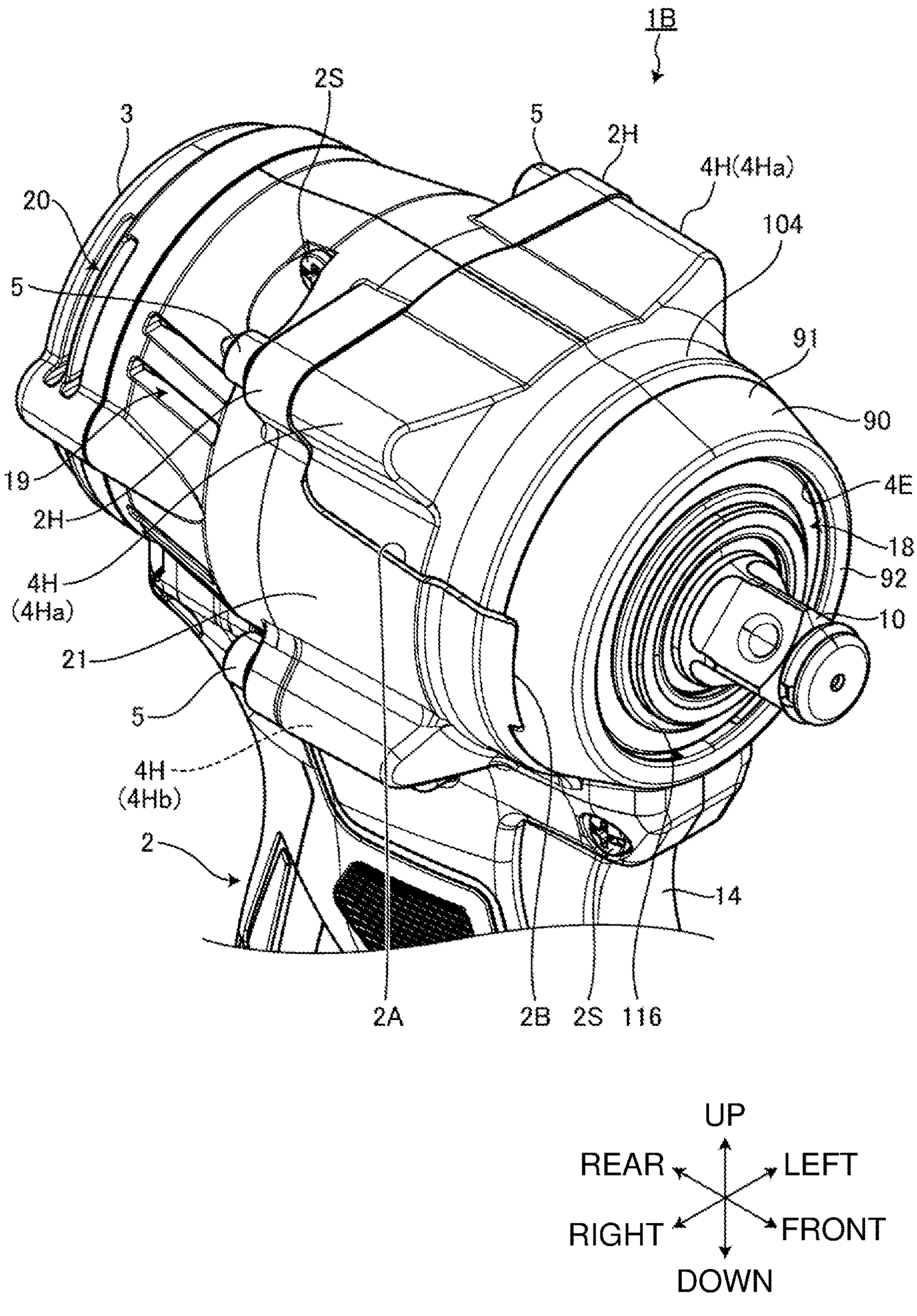
FIG. 12 is a perspective view of the upper portion of the impact tool according to the embodiment as viewed from the front.
Figure 13:
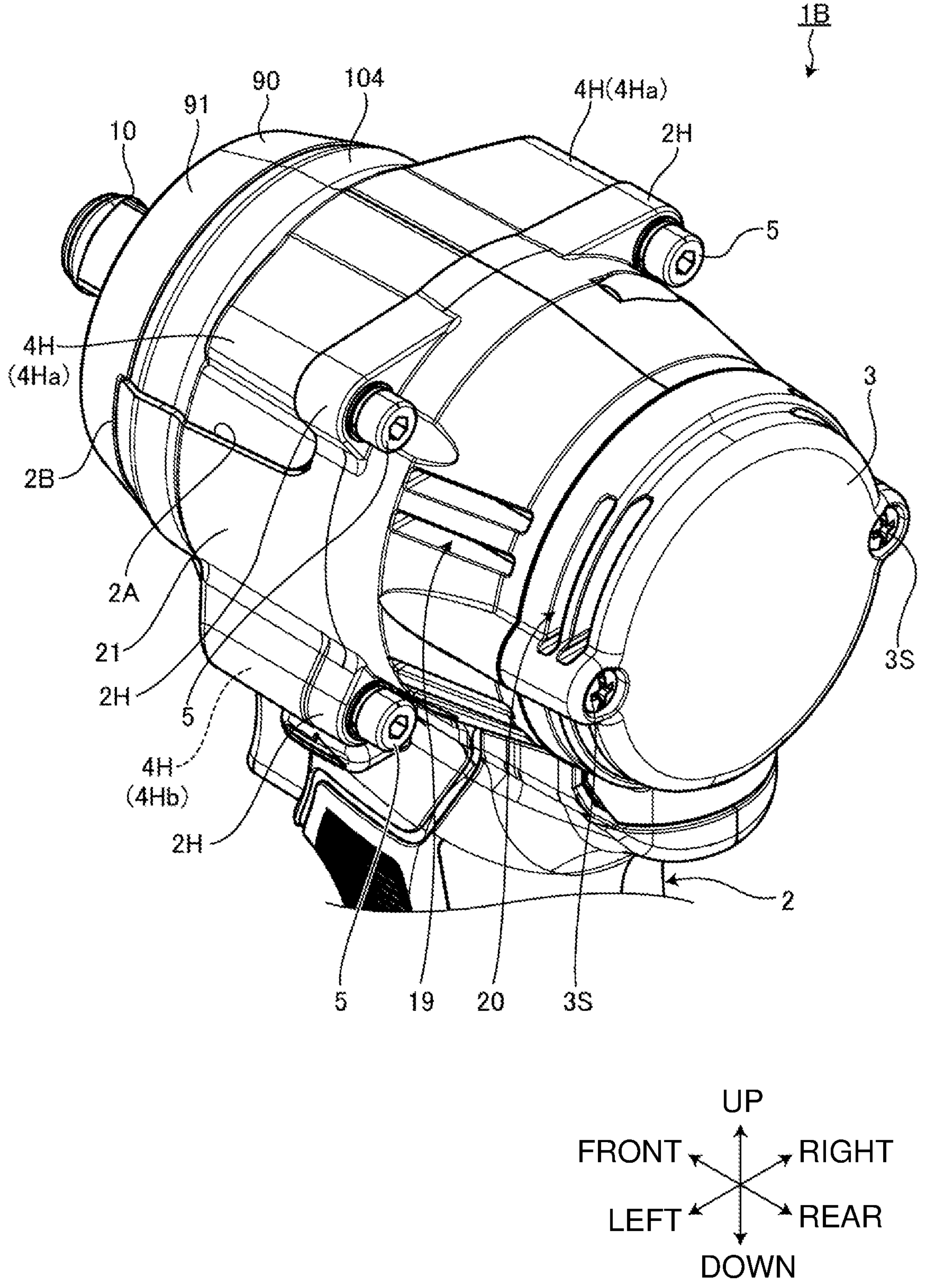
FIG. 13 is a perspective view of the upper portion of the impact tool according to the embodiment as viewed from the rear.
Figure 14:
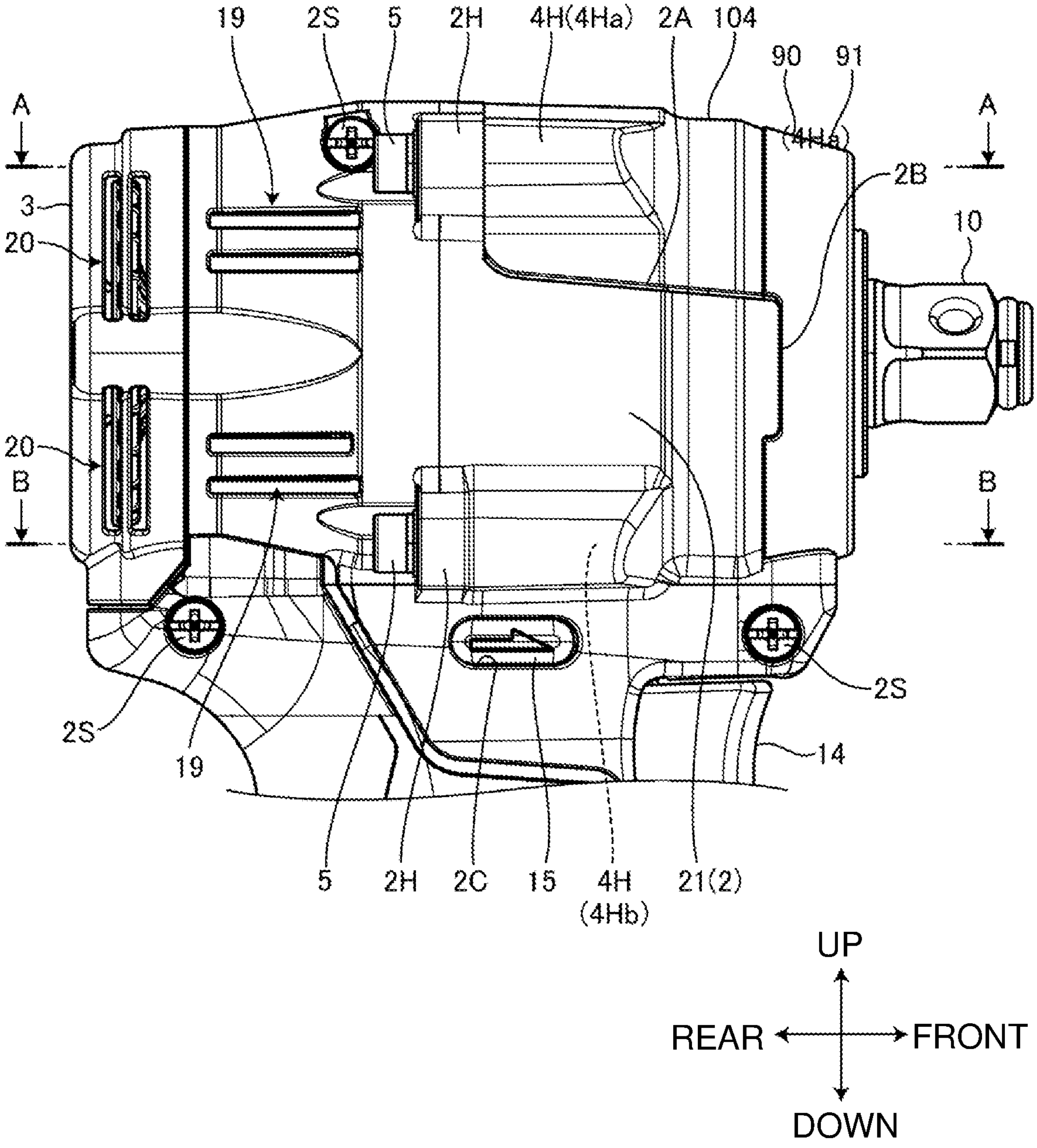
FIG. 14 is a side view of the upper portion of the impact tool according to the embodiment.
Figure 15:
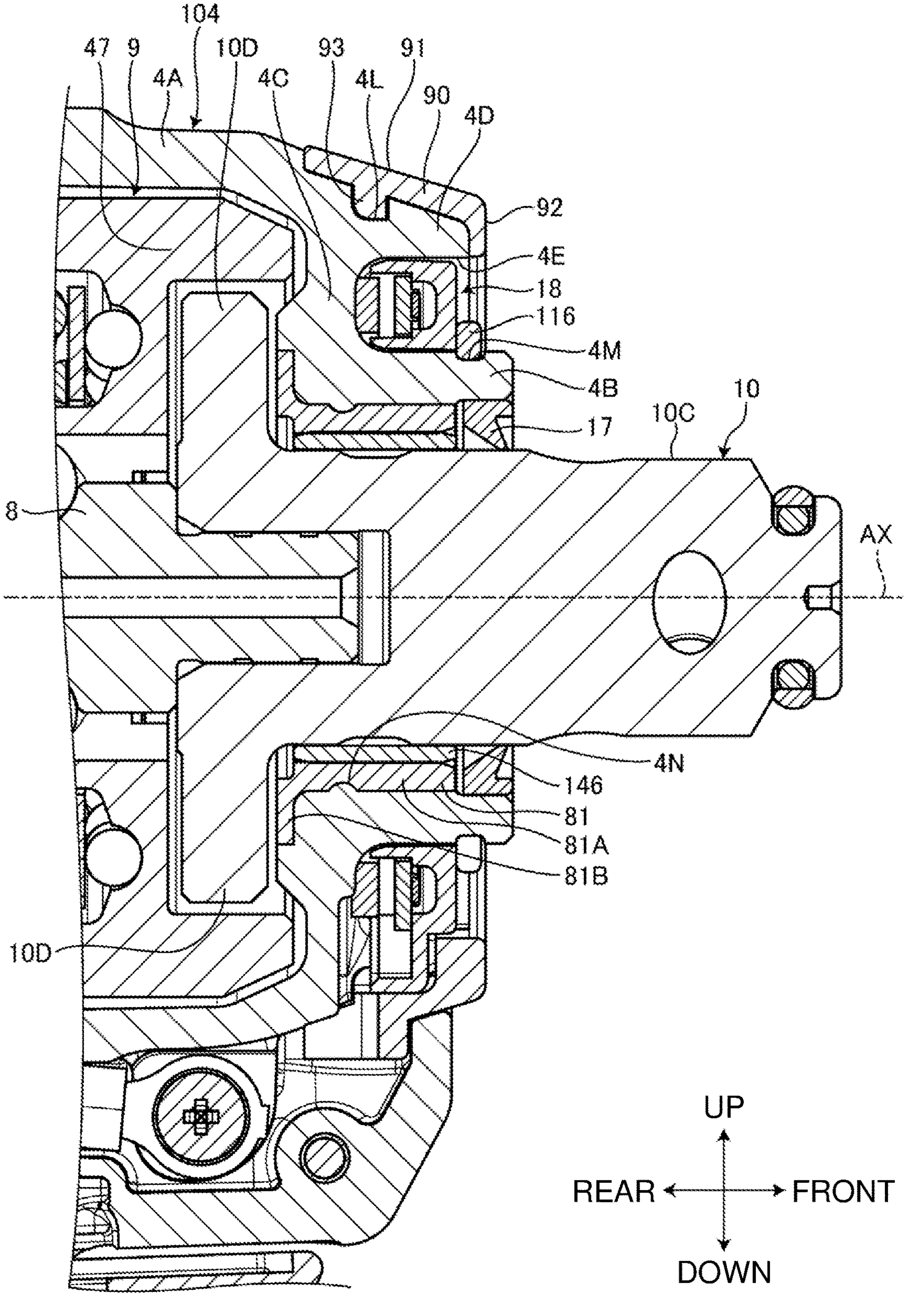
FIG. 15 is a partial longitudinal sectional view of the impact tool according to the embodiment.
Figure 16:
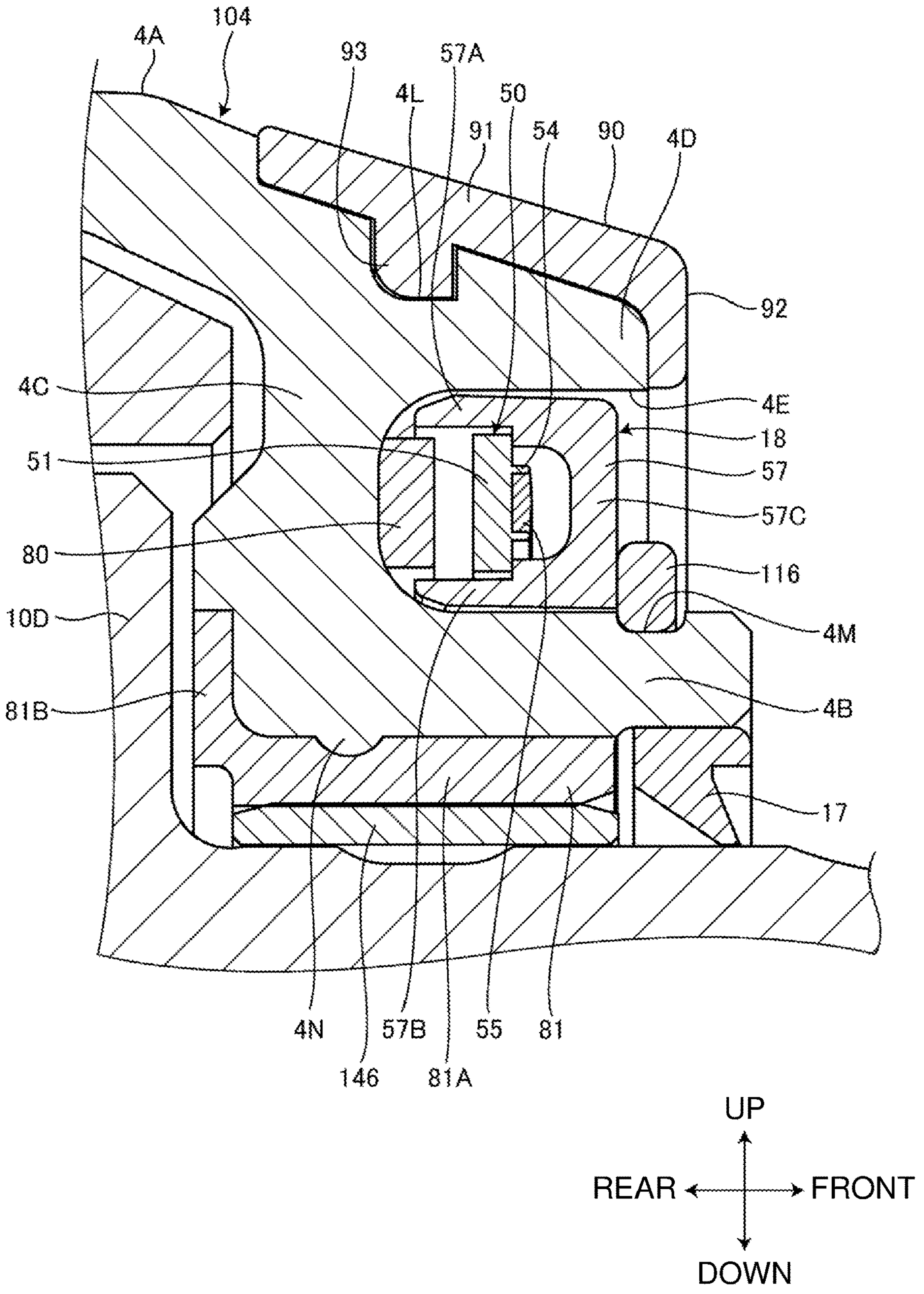
FIG. 16 is a partially enlarged longitudinal sectional view of the impact tool according to the embodiment.
Figure 17:
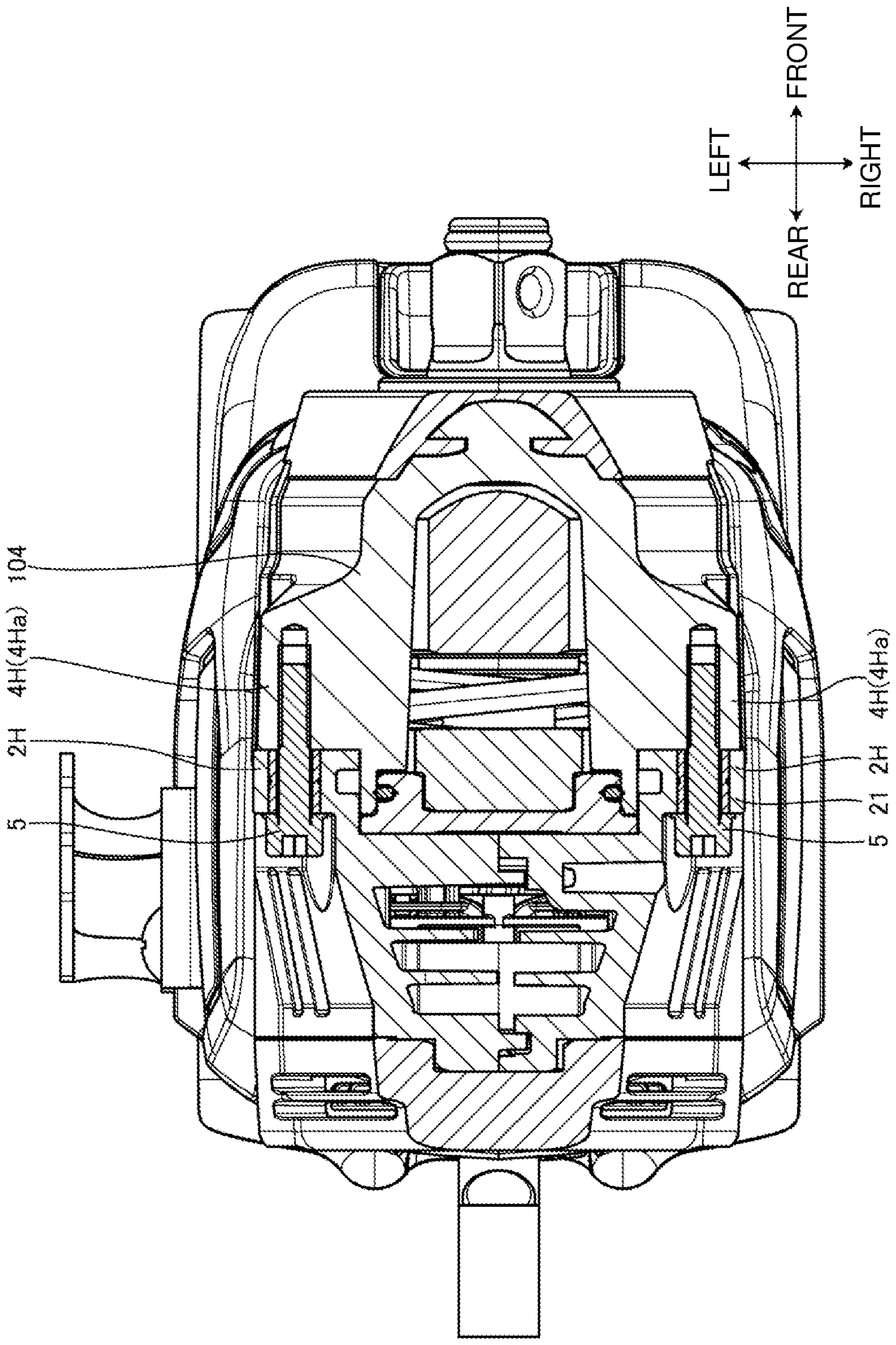
FIG. 17 is a horizontal sectional view of the upper portion of the impact tool according to the embodiment.
Figure 18:
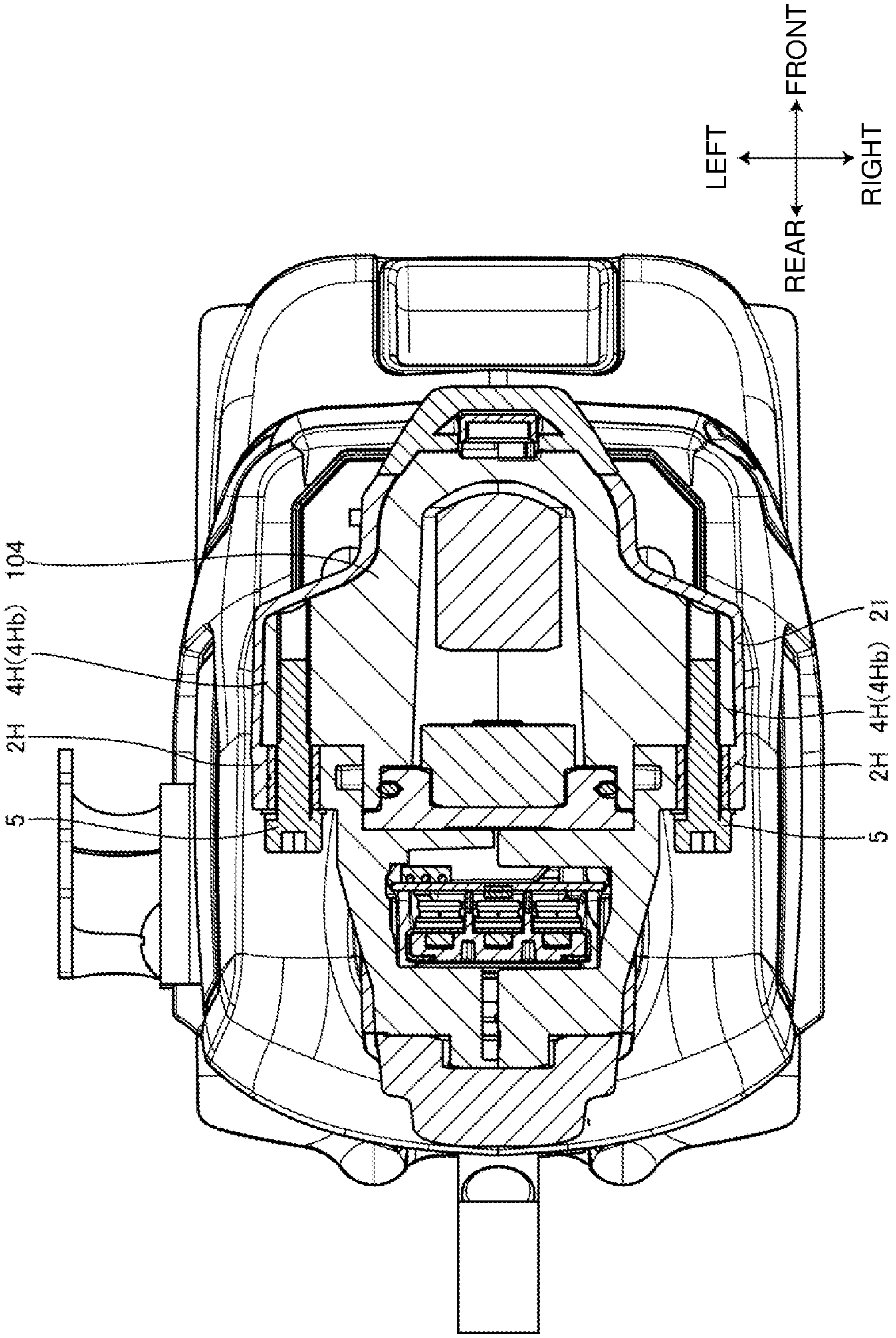
FIG. 18 is a horizontal sectional view of the upper portion of the impact tool according to the embodiment.
Figure 19:
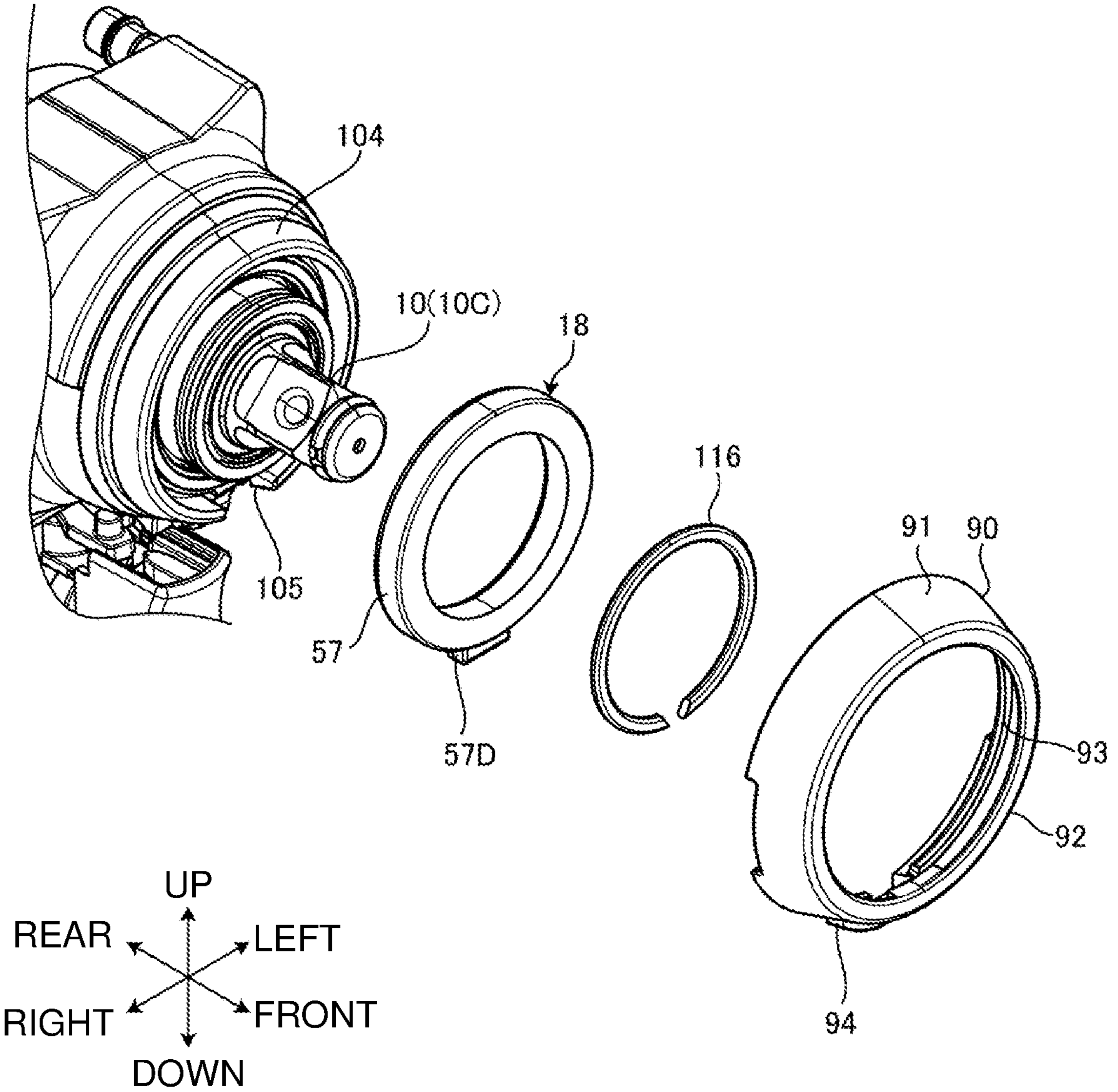
FIG. 19 is an exploded perspective view of the upper portion of the impact tool according to the embodiment as viewed from the front.
Figure 20:
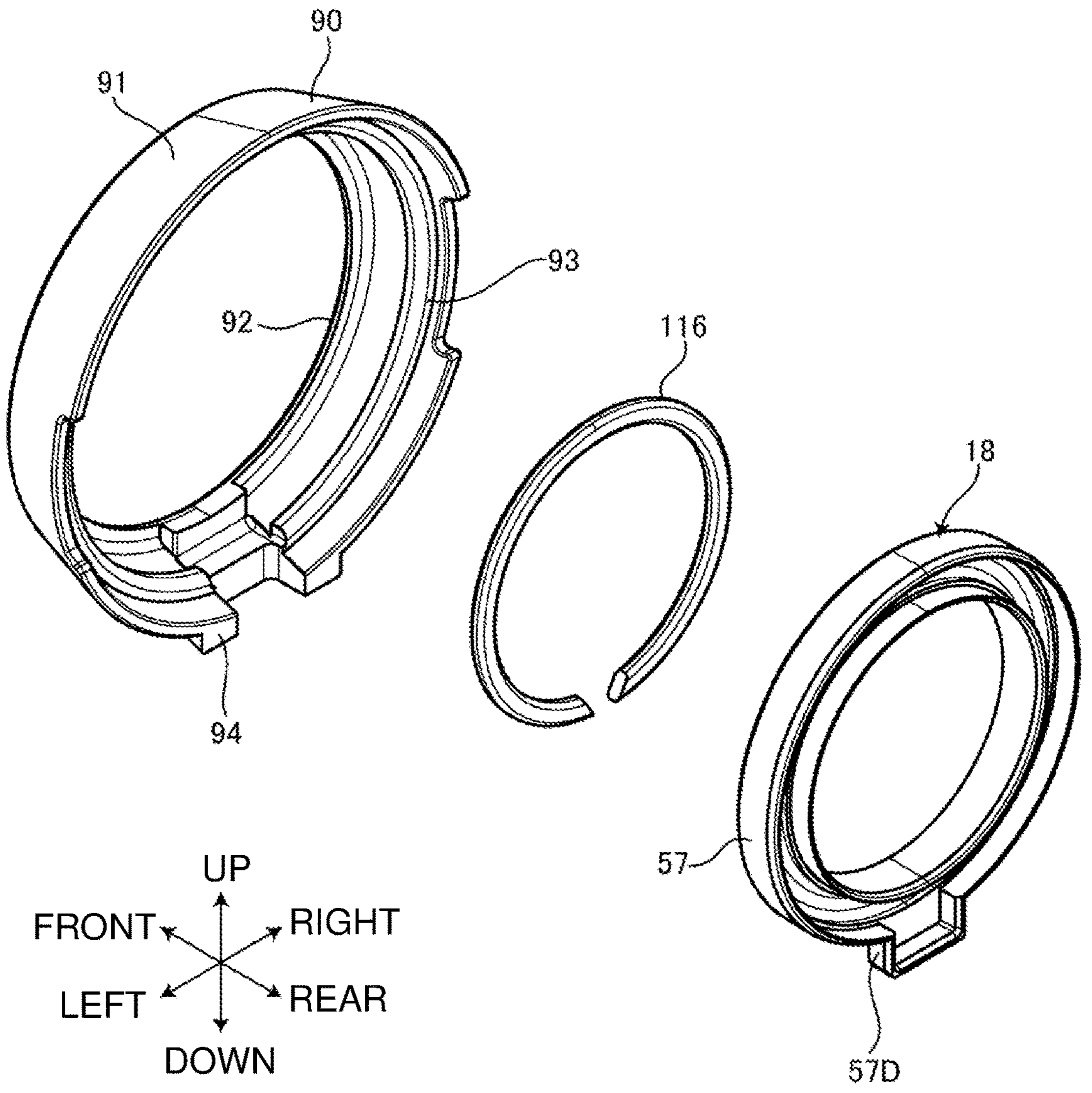
FIG. 20 is an exploded perspective view of a bumper and the light unit in the embodiment as viewed from the rear.
Figure 21:
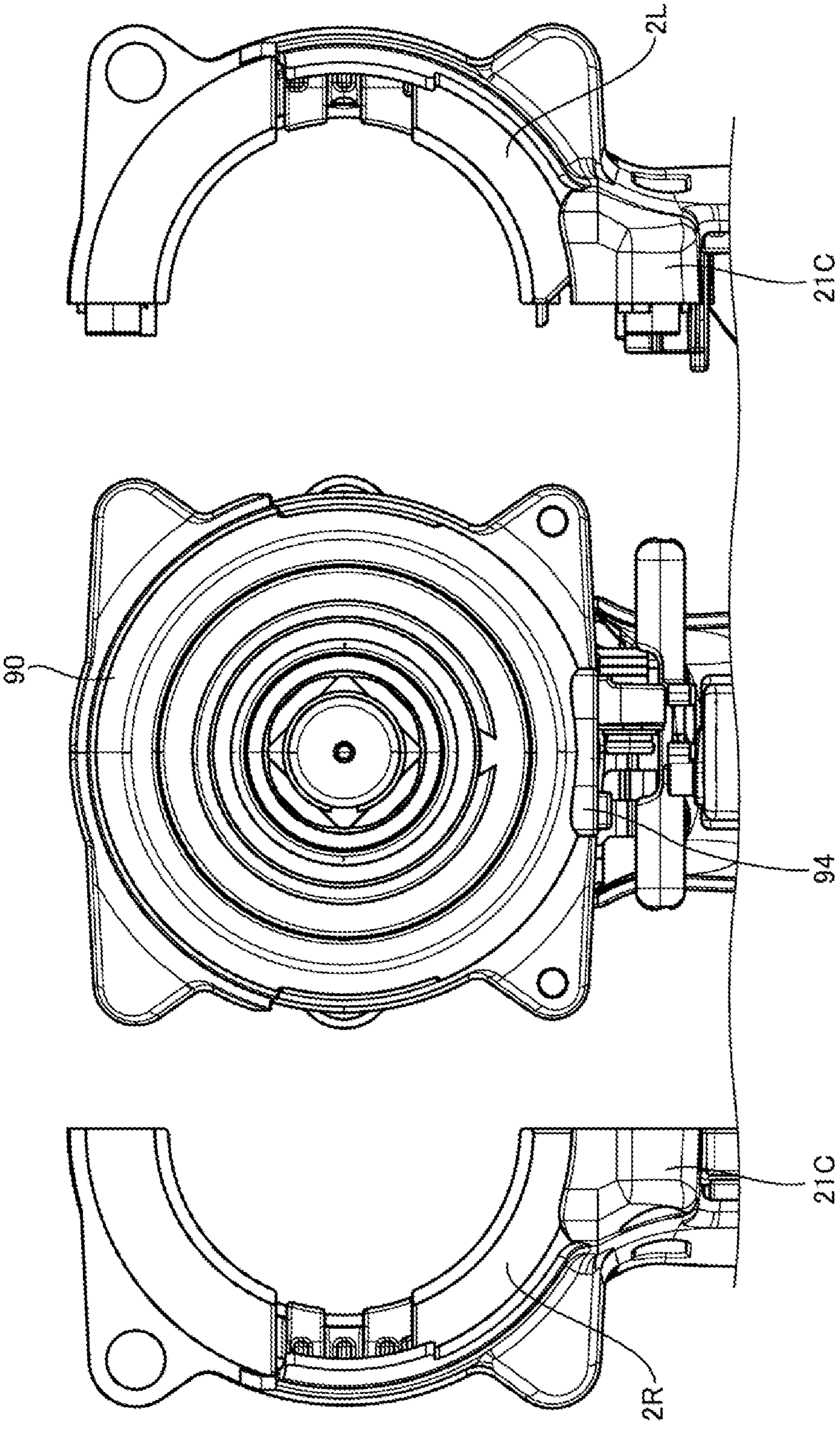
FIG. 21 is an exploded front view of the upper portion of the impact tool according to the embodiment.

FIG. 12 is a perspective view of an upper portion of an impact tool 1B according to the present embodiment as viewed from the front. FIG. 13 is a perspective view of the upper portion of the impact tool 1B as viewed from the rear. FIG. 14 is a side view of the upper portion of the impact tool 1B. FIG. 15 is a partial longitudinal sectional view of the impact tool 1B. FIG. 16 is a partially enlarged longitudinal sectional view of the impact tool 1B. FIG. 17 is a horizontal sectional view of the upper portion of the impact tool 1B, taken along line A-A in FIG. 14 as viewed in the direction indicated by the arrows. FIG. 18 is a horizontal sectional view of the upper portion of the impact tool 1B, taken along line B-B in FIG. 14 as viewed in the direction indicated by the arrows. FIG. 19 is an exploded perspective view of the upper portion of the impact tool 1B as viewed from the front. FIG. 20 is an exploded perspective view of a bumper 90 and the light unit 18 as viewed from the rear. FIG. 21 is an exploded front view of the upper portion of the impact tool 1B.

As in the above embodiment, the impact tool 1B is an impact wrench. The impact tool 1B includes the housing 2, the rear cover 3, a hammer case 104, the screws 5, the spindle 8, the striker 9, the anvil 10, the trigger lever 14, the forward-reverse switch lever 15, a circlip 116, the seal 17, the light unit 18, and the bumper 90.

The hammer case 104 accommodates the spindle 8. The hammer case 104 accommodates the striker 9. As in the above embodiment, the striker 9 is located frontward from the motor 6. The striker 9 is driven by the motor 6. The hammer case 104 accommodates a part of the anvil 10. The hammer case 104 is formed from a metal. The hammer case 104 in the embodiment is formed from aluminum. The hammer case 104 is cylindrical.

The hammer case 104 includes the rear cylinder 4A, the front cylinder 4B, the annular portion 4C, the projection 4D, the groove 4E, the screw bosses 4H, a bumper groove 4L, and a circlip groove 4M. The striker 9 is accommodated in the rear cylinder 4A. The front cylinder 4B is located frontward from the rear cylinder 4A. The rear cylinder 4A has a larger outer diameter than the front cylinder 4B. The rear cylinder 4A has a larger inner diameter than the front cylinder 4B. The annular portion 4C connects the front end of the rear cylinder 4A and the rear end of the front cylinder 4B. The projection 4D protrudes frontward from the outer edge of the annular portion 4C. The projection 4D is annular in a plane perpendicular to the rotation axis AX.

The hammer case 104 is connected to the front of the motor compartment 21 in the housing 2. The motor compartment 21 accommodates the rear portion of the hammer case 104. The motor compartment 21 is fastened to the rear of the hammer case 104 with the screws 5. The screws 5 are placed into openings of the screw bosses 2H from the rear, and then into threaded holes of the screw bosses 4H. The screw bosses 2H are four screw bosses 2H arranged circumferentially. The screw bosses 4H are four screw bosses 4H arranged circumferentially. The screws 5 are four screws 5 arranged circumferentially.

The rear cover 3 is fastened to the motor compartment 21 with the screws 3S tightened from the rear of the rear cover 3. The motor compartment 21 is fastened to the hammer case 104 with the screws 5 tightened from the rear of the screw bosses 2H. A total of six screws (two screws 3S and four screws 5) are tightened from the rear, facilitating the assembly of the impact tool 1B. An assembler of the impact tool 1B can tighten all the six screws from the rear without changing the orientation of the impact tool 1B.

The screw bosses 2H are each located in the upper left, lower left, upper right, and lower right of the rotation axis AX. The screw bosses 4H are each located in the upper left, lower left, upper right, and lower right of the rotation axis AX. The screw bosses 4H include upper left and upper right screw bosses 4Ha and lower left and lower right screw bosses 4Hb. The motor compartment 21 has its front portion covering at least a part of the surface of the hammer case 104. The motor compartment 21 has its front portion covering at least the surfaces of the lower left and lower right screw bosses 4Hb. The motor compartment 21 covering the surface of the hammer case 104 has an upper end 2A located upward from the middle of the hammer case 104 in the vertical direction. The motor compartment 21 covering the surface of the hammer case 104 has a front end 2B located frontward from the rear end of the bumper 90 in the front-rear direction. In other words, the motor compartment 21 covers a part of the bumper 90. The forward-reverse switch lever 15 is located in an opening 2C in a lower portion of the motor compartment 21.

As shown in FIGS. 12, 13, 14, 17, and 18, the motor compartment 21 does not cover the surfaces of the upper left and upper right screw bosses 4Ha. The motor compartment 21 may cover the surfaces of the upper left and upper right screw bosses 4Ha.

The hammer case 104 may be heated by, for example, rotation of the spindle 8 and the operation of the striker 9. The motor compartment 21 covers the surface of the lower portion of the hammer case 104 including the surfaces of the lower left and lower right screw bosses 4Hb. This reduces the likelihood that the hand of the operator operating the forward-reverse switch lever 15 or the trigger lever 14 directly touches the hammer case 104.

The spindle 8 rotates with a rotational force from the motor 6. The striker 9 strikes the anvil 10 in the rotation direction with a rotational force from the spindle 8. The anvil 10 is an output unit in the impact tool 1B and is operable with a rotational force from the motor 6.

The anvil shaft 10C in the anvil 10 is rotatably supported by an anvil bearing 146. The anvil bearing 146 is an oilless bearing that is a slide bearing. The anvil bearing 146 is formed from iron. The anvil bearing 146 is cylindrical.

The anvil bearing 146 in the embodiment is held by the front cylinder 4B in the hammer case 104 with a bush 81. The bush 81 is formed from iron. The bush 81 is fixed to the hammer case 104 by insert molding.

The bush 81 includes a cylinder 81A and a flange 81B. The cylinder 81A is located inward from the front cylinder 4B. The flange 81B extends outward in the radial direction from the rear end of the cylinder 81A. The cylinder 81A is fixed to the inner circumferential surface of the front cylinder 4B. The flange 81B is fixed to the rear surface of the annular portion 4C. The front cylinder 4B in the embodiment includes a protrusion 4N. The protrusion 4N protrudes inward in the radial direction from the inner circumferential surface of the front cylinder 4B. The protrusion 4N allows engagement to firmly fix the bush 81 and the front cylinder 4B to each other.

The bush 81 is insert-molded in the hammer case 104. The anvil bearing 146 is then press-fitted into the cylinder 81A in the bush 81. As described above, the hammer case 104 is formed from aluminum, whereas the bush 81 is formed from iron. The bush 81 has a higher hardness than the front cylinder 4B. The anvil bearing 146 is press-fitted into the bush 81 having a higher hardness. The anvil bearing 146 is thus fixed firmly to the bush 81. The anvil bearing 146 with a smaller dimension in the front-rear direction can be fixed firmly to the bush 81.

The bush 81 may be fixed to the hammer case 104 with a method other than insert molding. The bush 81 may be fixed to the front cylinder 4B after the surface of the bush 81 is knurled or serrated.

The flange 81B protects the rear surface of the annular portion 4C. The anvil projections 10D may have the front surfaces in contact with the rear surface of the annular portion 4C. With the flange 81B located on the rear surface of the annular portion 4C, the front surfaces of the anvil projections 10D hit the flange 81B before hitting the rear surface of the annular portion 4C. This reduces wear of the rear surface of the annular portion 4C.

The light unit 18 is located at the front of the hammer case 104. The light unit 18 is annular. The light unit 18 surrounds the front cylinder 4B. The light unit 18 surrounds the anvil shaft 10C with the front cylinder 4B in between.

As in the above embodiment, the light unit 18 includes the COB light 50 and the optical member 57. The optical member 57 is at least partially located frontward from the COB light 50. The optical member 57 includes the outer cylinder 57A, the inner cylinder 57B, and the light transmitter 57C. The outer cylinder 57A is located radially outward from the COB light 50. The inner cylinder 57B is located radially inward from the COB light 50. The light transmitter 57C is located frontward from the COB light 50. Light emitted from the COB light 50 passes through the light transmitter 57C and illuminates an area ahead of the light unit 18. The shock absorber 80 is located behind the COB light 50.

The projection 4D on the hammer case 104 is located radially outward from the COB light 50. The projection 4D protrudes frontward from the COB light 50. The projection 4D is substantially annular. The projection 4D is located radially outward from the optical member 57. The light transmitter 57C has its front surface located rearward from the front end face of the projection 4D.

The hammer case 104 has the groove 4E radially inward from the projection 4D. The groove 4E is located on the front of the hammer case 104. The groove 4E is annular in a plane perpendicular to the rotation axis AX. The groove 4E is recessed rearward from the front end of the hammer case 104. The groove 4E is between the front cylinder 4B and the projection 4D in the radial direction. The groove 4E surrounds the anvil shaft 10C. The light unit 18 is received in the groove 4E.

The circlip 116 is received in the circlip groove 4M located on the front cylinder 4B. The circlip groove 4M is located frontward from the front surface of the light transmitter 57C. The circlip 116 supports the optical member 57 from the front. The circlip 116 is in contact with the radially inner edge of the front surface of the light transmitter 57C.

The bumper 90 covers the front end of the surface of the hammer case 104. The bumper 90 is annular. The bumper 90 is located outward in the radial direction from the light unit 18. The bumper 90 protects the light unit 18. The bumper 90 protects at least a part of the hammer case 104.

The light unit 18 is aligned with at least a part of the bumper 90 in the front-rear direction. More specifically, the bumper 90 overlaps the light unit 18 in the axial direction.

The light unit 18 is aligned with at least a part of the anvil bearing 146 in the front-rear direction. More specifically, the anvil bearing 146 overlaps the light unit 18 in the axial direction.

The bumper 90 is formed from an elastomer. The elastomer in the bumper 90 may be a thermoplastic elastomer or a thermosetting elastomer. The bumper 90 has a rubber hardness Hs (JIS A) of less than or equal to 100.

The bumper 90 covers the outer circumferential surface and the front end face of the projection 4D. The bumper 90 includes a cylindrical portion 91, an annular portion 92, and a protrusion 93. The cylindrical portion 91 covers the outer circumferential surface of the projection 4D. The annular portion 92 covers the front end face of the projection 4D. The protrusion 93 protrudes inward in the radial direction from the inner circumferential surface of the cylindrical portion 91. The protrusion 93 is annular in a plane perpendicular to the rotation axis AX.

The projection 4D has the bumper groove 4L on its outer circumferential surface. The bumper groove 4L surrounds the rotation axis AX. The protrusion 93 is received in the bumper groove 4L on the outer circumferential surface of the projection 4D.

The bumper 90 has its rear end located frontward from the front end of the hammer 47 in the front-rear direction.

As shown in FIG. 19, a slit 105 is located in a lower portion of the front end of the hammer case 104. The protrusion 57D in the optical member 57 fits in the slit 105. This restricts rotation of the light unit 18 relative to the hammer case 104.

As shown in FIGS. 19, 20, and 21, the bumper 90 includes a projection 94 protruding downward from the lower portion of the cylindrical portion 91. As shown in FIG. 21, the projection 94 is held between the left housing 2L and the right housing 2R in the lateral direction. The cover 21C in the motor compartment 21 covers the projection 94 from the front. This reduces the likelihood of the bumper 90 slipping frontward from the housing 2 or restricts rotation of the bumper 90 relative to the housing 2.

As described above, the elastomer bumper 90 surrounds the projection 4D in the embodiment. The bumper 90 protects the light unit 18. When, for example, the impact tool 1B hits a surrounding object, the bumper 90 hits the object to reduce shock from the object to the light unit 18 with an elastic force from the bumper 90. This reduces deterioration in the emission performance of the light unit 18.

Modifications

Modifications of the impact tool 1B will now be described.

In the above embodiment, the bumper 90 is located outward in the radial direction from the optical member 97. The bumper 90 may have its front end facing the outer edge of the front surface of optical member 97. The bumper 90 may serve as a retainer to restrict forward movement of the light unit 18 from the groove 4E.

In the above embodiment, the bumper 90 surrounds the projection 4D. The bumper 90 has its rear end located frontward from the front end of the hammer 47. The bumper 90 may have its rear end located rearward from the front end of the hammer 47. The bumper 90 may cover the entire surface of the hammer case 104.

In the above embodiment, the bumper 90 is replaceable for the hammer case 104. With multiple bumpers 90 in different colors, a bumper 90 in a first color may be attached to a first impact tool, and a bumper 90 in a second color may be attached to a second impact tool. The operator can differentiate multiple impact tools from one another by the colors of the bumpers 90.

In the above embodiment, the bumper 90 may be at least partially formed from a luminous material. This allows the operator to identify the impact tool 1B at, for example, nighttime.

Figure 22:
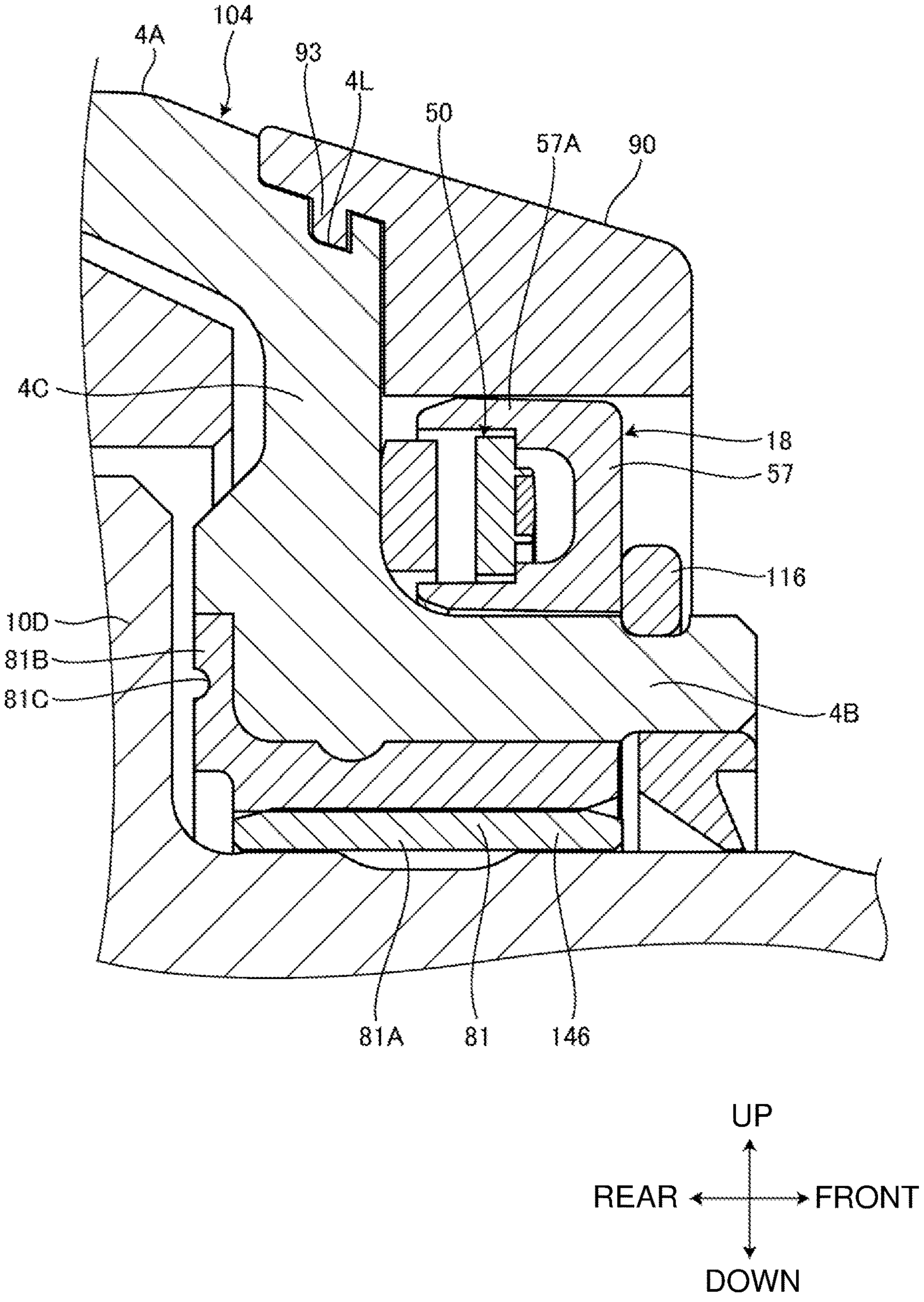
FIG. 22 is a partially enlarged longitudinal sectional view of an impact tool according to a modification.

FIG. 22 is a partially enlarged longitudinal sectional view of an impact tool 1B according to a modification. As shown in FIG. 22, the projection 4D on the hammer case 104 may be eliminated. The bumper 90 may directly support the light unit 18 from radially outside. The bumper 90 may be in contact with the outer cylinder 57A in the optical member 57 in the light unit 18.

As shown in FIG. 22, the flange 81B in the bush 81 may have a recess 81C on its rear surface. The recess 81C may contain a lubricant oil. The lubricant oil reduces sliding resistance at a contact between the front surfaces of the anvil projections 10D and the rear surface of the flange 81B.

In the example in FIG. 22, the bumper 90 may be integral with the optical member 57.

In the above embodiment, the bumper 90 may be fixed to the hammer case 104 with an adhesive. The bumper 90 may be fixed to the hammer case 104 with fasteners such as screws or rivets.

In the above embodiment, the hammer case 104 may be integral with the bumper 90.

The bumper 90 may be fixed to the hammer case 104 by insert molding.

Other Embodiments

In the above embodiments, the groove 4E may be replaced with multiple nonannular grooves 4E surrounding the anvil shaft 10C at intervals. Each groove 4E may receive a COB light chip and an optical member.

In the above embodiments, the light 50 is a COB light. The light 50 may be any light including a substrate and a light emitter on the substrate, rather than a COB light.

In the above embodiments, the impact tool 1 is an impact wrench.

The impact tool 1 may be an impact driver.

In the above embodiments, the impact tool 1 may use utility power (alternating current power supply) instead of the battery pack 25. In the above embodiments, the striker 9 may be an oil pulse mechanism also called to as a fluid-drive, a stealth force, a hydraulic impact or a quiet strike.

REFERENCE SIGNS LIST

1 impact tool
1B impact tool
2 housing
2A upper end
2B front end
2C opening
2H screw boss
2L left housing
2R right housing
2S screw
3 rear cover
3S screw
4 hammer case
4A rear cylinder
4B front cylinder
4C annular portion
4D projection
4E groove
4F snap ring groove
4H screw boss
4Ha screw boss
4Hb screw boss
4J facing surface
4K protrusion
4L bumper groove
4M circlip groove
4N protrusion
5 screw
6 motor
7 reducer
8 spindle
8A flange
8B spindle shaft
8C ring portion
8D spindle groove
8E protrusion
8F grease groove
9 striker
10 anvil (output unit)
10B recess
10C anvil shaft
10D anvil projection
11 ball
12 fan
12A bush
13 battery mount
14 trigger lever
15 forward-reverse switch lever
16 snap ring
17 seal
18 light unit
19 inlet
20 outlet
21 motor compartment
21C cover
21D upper surface
22 grip
23 battery holder
24 bearing box

25 battery pack
26 stator
27 rotor
28 stator core
29 front insulator
29S screw
30 rear insulator
31 coil
32 rotor core
33 rotor shaft
34 rotor magnet
35 sensor magnet
37 sensor board
38 fusing terminal
39 rotor bearing
40 rotor bearing
41 pinion gear
42 planetary gear
42P pin
43 internal gear
44 spindle bearing
45 washer
46 anvil bearing
46A outer sleeve
46B inner sleeve
46C flange
47 hammer
47A hammer groove
47B hammer projection
47C recess
47D body
47E rear outer cylinder
47F front outer cylinder
47G inner cylinder
47H ball groove
48 ball
49 coil spring
49A first coil spring
49B second coil spring
50 chip-on-board light-emitting diode (COB LED)
51 substrate
51A ring portion
51B support
52 LED chip (light emitter)
54 bank
55 phosphor
57 optical member
57A outer cylinder
57B inner cylinder
57C light transmitter
57D protrusion
57E incident surface
57F emission surface
57G inner circumferential protrusion
57H stopper
57J recess
80 shock absorber
81 bush
81A cylinder
81B flange
81C recess
90 bumper
91 cylindrical portion
92 annular portion
93 protrusion
94 projection
104 hammer case
105 slit
116 circlip
146 anvil bearing
180 lead wire
AX rotation axis

What is claimed is:

1. An impact tool, comprising:
a motor;
a striker rotatable by the motor;
an anvil with an anvil shaft and strikable by the striker in a rotation direction;
a light that is annular, that surrounds the anvil shaft and that is configured to illuminate an area adjacent to a front end of the anvil; and
a hammer case formed from metal, accommodating the striker and holding the light, the hammer case including a projection located radially outward from the light.

2. The impact tool according to claim 1, wherein
the projection protrudes frontward from the light.

3. The impact tool according to claim 1, wherein
the projection surrounds the anvil.

4. The impact tool according to claim 3, further comprising:
an optical member including a light transmitter located frontward from the light,
wherein the projection is located radially outward from the optical member.

5. The impact tool according to claim 4, wherein
the anvil shaft is located radially inward from the optical member,
the hammer case includes a front cylinder surrounding the anvil shaft,
the impact tool further comprises a snap ring received in a snap ring groove on the front cylinder, and
the snap ring supports the optical member from front.

6. The impact tool according to claim 4, wherein
the optical member includes a protrusion located downward from the light transmitter,
the impact tool further comprises a housing fastened to a rear of the hammer case and accommodating the motor, and
the housing includes a cover covering the protrusion from front.

7. The impact tool according to claim 6, wherein
the hammer case has a facing surface facing an upper surface of the cover, and
the facing surface extends in a lateral direction.

8. The impact tool according to claim 4, wherein
the anvil includes an anvil shaft located radially inward from the optical member,
the impact tool further comprises an anvil bearing held by the hammer case and supporting the anvil shaft in a rotatable manner, and
the striker has a front end located frontward from a rear end of the anvil bearing.

9. The impact tool according to claim 1, further comprising:
a housing fastened to a rear of the hammer case with a screw, the housing accommodating the motor,
wherein the hammer case includes a screw boss engaged with the screw, and
at least a part of the housing covers the screw boss.

10. The impact tool according to claim 1, further comprising:
a bumper that is annular and comprising an elastomer, the bumper being located outward in a radial direction from the light, wherein the light is located at a front of the hammer case.

11. The impact tool according to claim 10, wherein the hammer case has a groove that is annular on a front portion of the hammer case, and the light is received in the groove.

12. The impact tool according to claim 11, further comprising:

an anvil bearing supporting the anvil in a rotatable manner, wherein the hammer case includes a rear cylinder accommodating the striker, a front cylinder located frontward from the rear cylinder, the front cylinder holding the anvil bearing, an annular portion connecting a front end of the rear cylinder and a rear end of the front cylinder, and a projection protruding frontward from an outer edge of the annular portion, the groove is between the front cylinder and the projection, and the bumper covers an outer circumferential surface of the projection.

13. The impact tool according to claim 12, wherein the bumper covers a front end face of the projection.

14. The impact tool according to claim 12, wherein the bumper includes a cylindrical portion covering the outer circumferential surface of the projection, and a protrusion protruding inward in the radial direction from an inner circumferential surface of the cylindrical portion, the projection has a bumper groove on the outer circumferential surface, and the protrusion is received in the bumper groove.

15. The impact tool according to claim 10, wherein the bumper has a rubber hardness Hs JIS A of less than or equal to 100.

16. The impact tool according to claim 10, wherein the striker includes a hammer rotatable by the motor, and the bumper is located frontward from the hammer in a front-rear direction.

17. The impact tool according to claim 1, wherein the light is a chip-on-board light.

18. The impact tool according to claim 1, wherein the light is in an annular groove and a radially outer extent of the annular groove is bounded by the projection.

19. The impact tool according to claim 18, wherein the projection is a portion of a unitary component that includes the annular groove.

* * * * *